(12) United States Patent
Yamamoto et al.

(10) Patent No.: US 8,442,727 B2
(45) Date of Patent: May 14, 2013

(54) ELECTRIC VEHICLE AND METHOD FOR SETTING TOTAL ALLOWABLE DISCHARGE ELECTRIC ENERGY IN THE ELECTRIC VEHICLE

(75) Inventors: Masaya Yamamoto, Kasugai (JP); Yuichi Tanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/376,303

(22) PCT Filed: Jun. 5, 2009

(86) PCT No.: PCT/JP2009/060359
§ 371 (c)(1),
(2), (4) Date: Feb. 16, 2012

(87) PCT Pub. No.: WO2010/140253
PCT Pub. Date: Dec. 9, 2010

(65) Prior Publication Data
US 2012/0143425 A1 Jun. 7, 2012

(51) Int. Cl.
*B60R 22/00* (2006.01)
(52) U.S. Cl.
USPC .............. 701/49; 903/907; 903/908; 320/109
(58) Field of Classification Search .................... 701/22, 701/27, 49; 903/907, 908; 320/109; 700/22, 700/286
See application file for complete search history.

(56) References Cited

U.S. PATENT DOCUMENTS

| | | | |
|---|---|---|---|
| 6,377,030 B1* | 4/2002 | Asao et al. | 320/161 |
| 2006/0097671 A1* | 5/2006 | Yoshida | 318/109 |
| 2007/0182377 A1* | 8/2007 | Vandensande | 320/132 |
| 2007/0188138 A1* | 8/2007 | Kobayashi | 320/119 |
| 2007/0194754 A1* | 8/2007 | Fukuzawa et al. | 320/112 |
| 2008/0143119 A1* | 6/2008 | Asada | 290/40 B |
| 2009/0243621 A1* | 10/2009 | Kudo et al. | 324/426 |
| 2009/0258282 A1* | 10/2009 | Harada et al. | 429/61 |
| 2009/0299560 A1* | 12/2009 | Tomatsuri et al. | 701/22 |
| 2010/0185405 A1* | 7/2010 | Aoshima et al. | 702/63 |
| 2011/0181245 A1* | 7/2011 | Wey et al. | 320/118 |
| 2012/0028105 A1* | 2/2012 | Kumar et al. | 429/149 |
| 2012/0052345 A1* | 3/2012 | Kai et al. | 429/61 |
| 2012/0237799 A1* | 9/2012 | Jiang et al. | 429/7 |

FOREIGN PATENT DOCUMENTS

| | | |
|---|---|---|
| JP | 09-191505 A | 7/1997 |
| JP | 10-290532 A | 12/2003 |

(Continued)

OTHER PUBLICATIONS

International Search Report mailed Aug. 18, 2009 of PCT/JP2009/060359 & Written Opinion.

*Primary Examiner* — Calvin Cheung
(74) *Attorney, Agent, or Firm* — Kenyon & Kenyon LLP

(57) ABSTRACT

When an accumulated charge amount of a first slave battery reaches a preset accumulated charge amount or less, the first slave battery is set as a used secondary battery, and when a master battery and a second slave battery are connected to sides of motors, accumulated charge amount differences of the master battery and the second slave battery are respectively set as allowable discharge electric energies E1 and E3, value 0 is set as an allowable discharge electric energy E2, and a sum of these allowable discharge electric energies is set as an EV priority allowable electric energy that is an electric energy that is allowed to be discharged as a whole of the master battery, and the two slave batteries.

11 Claims, 8 Drawing Sheets

FOREIGN PATENT DOCUMENTS

| | | |
|---|---|---|
| JP | 2005-237064 A | 9/2005 |
| JP | 2008-109840 A | 5/2008 |
| JP | 2008-167620 A | 7/2008 |
| JP | 2008-187884 A | 8/2008 |

* cited by examiner ic VEHICLE AND METHOD FOR SETTING TOTAL ALLOWABLE DISCHARGE ELECTRIC ENERGY IN THE ELECTRIC VEHICLE This is a 371 national phase application of PCT/JP2009/060359 filed 5 Jun 2009, the contents of which are incorporated herein by reference.

1. Technical Field

The present invention relates to an electric vehicle, and a method for setting a total allowable discharge electric energy in the electric vehicle.

2. Background Art

Conventionally, as an electric vehicle of this type, there has been proposed an electric vehicle including a motor generator, an inverter that drives the motor generator, a first accumulator, a second accumulator, a first converter that performs voltage conversion between the first accumulator, and a main positive bus and a main negative bus to which the inverter is connected, and a second converter that performs voltage conversion between the second accumulator, and the main positive bus and the main negative bus (for example, see Patent Document 1). In the electric vehicle, the residual electric energy until a state of charge (SOC) in which an allowable discharge electric energy is restricted is calculated with respect to each of the accumulators, a discharge electric power distribution ratio is calculated in accordance with a ratio of the calculated residual electric energy of each of the accumulators, and each of the converters is controlled in accordance with the calculated discharge electric power distribution ratio, whereby the case is restrained, in which any one of the accumulators reaches a discharge limit earlier than the other accumulators.

PRIOR ART DOCUMENT

Patent Document

Patent Document 1: Japanese Patent Laid-Open No. 2008-109840

SUMMARY OF THE INVENTION

In an electric vehicle including a plurality of accumulators similarly to the aforementioned electric vehicle, in the case of releasing connection of the accumulator in which the residual electric energy reaches value 0 or a value close to value 0 to the motor generator side, the state of charge of the accumulator with the connection to the motor generator side released changes due to a property thereof so that the residual electric energy of the accumulator sometimes changes, and it is desired that in consideration thereof, the residual electric energy as a whole is more properly calculated from each of the residual electric energy of a plurality of accumulators.

The electric vehicle and the method for setting a total allowable discharge electric energy in the electric vehicle of the present invention have a main object to more properly set a total allowable discharge electric energy that is an electric energy that is allowed to be discharged in a whole of a battery device having a plurality of secondary batteries capable of exchanging electric power with a motor.

The electric vehicle and the method for setting a total allowable discharge electric energy in the electric vehicle adopt the following measure in order to attain the aforementioned main object.

According to one aspect, the present invention is directed to an electric vehicle. The electric vehicle travelling by using power from a motor, includes: a battery device having a plurality of secondary batteries capable of exchanging electric power with a motor, connecting-releasing parts that perform connection of each of a plurality of secondary batteries to the motor side and release of the connection; a charger that is connected to an external power supply in a state of system shutdown, and charges the plurality of secondary batteries by using electric power from the external power supply; a used secondary battery setting unit that sets a secondary battery in which an accumulated charge amount that is an electric energy that can be discharged reaches a preset accumulated charge amount or less out of the plurality of secondary batteries, as a used secondary battery; and a total allowable discharge electric energy setting unit that sets a total allowable discharge electric energy that is an electric energy that is allowed to be discharged in a whole of the battery device without reflecting an allowable discharge electric energy that is the electric energy allowed to be discharged with respect to the used secondary battery, when the vehicle travels by the power from the motor in a state in which at least one of usable secondary batteries that are the secondary batteries that are not set as the used secondary battery out of the plurality of secondary batteries is connected to the motor side.

In the electric vehicle of the present invention, the secondary battery with an accumulated charge amount that is an electric energy capable of being discharged reaching a preset accumulated charge amount or less out of the plurality of secondary batteries is set as a used secondary battery, and the total allowable discharge electric energy that is an electric energy that is allowed to be discharged in the whole of the battery device is set without reflecting the allowable discharge electric energy that is the electric energy allowed to be discharged with respect to the used secondary battery, when the vehicle travels by the power from the motor in a state in which at least one of the usable secondary batteries that are the secondary batteries that are not set as the used secondary batteries out of the plurality of secondary batteries is connected to the motor side. The accumulated charge amount sometimes varies even when the secondary battery is not connected to the motor side, depending on the property of the secondary battery, and therefore, the accumulated charge amount of the used secondary battery sometimes varies to vary the allowable discharge electric energy of the used secondary battery, but the total allowable discharge electric energy is set without reflecting the allowable discharge electric energy with respect to the used secondary battery when the vehicle travels by the power from the motor in the state in which at least one of the usable secondary batteries is connected to the motor side, whereby the total allowable discharge electric energy can be more properly set as compared with the electric vehicle that sets the total allowable discharge electric energy with reflection of the allowable discharge electric energy of the used secondary battery.

In one preferable application of the electric vehicle of the invention, the total allowable discharge electric energy setting unit is a unit that sets a difference between the accumulated charge amount of the usable secondary battery and the preset accumulated charge amount as the allowable discharge electric energy with respect to the usable secondary battery, sets value 0 as the allowable discharge electric energy with respect to the used secondary battery, and sets a sum of the respective allowable discharge electric energies of the plurality of secondary batteries as the total allowable discharge electric energy.

In another preferable application of the electric vehicle of the invention, the battery device is a device having a main secondary battery and one or more auxiliary secondary batteries as the plurality of secondary batteries, and having a main connecting-releasing part that performs connection of the main secondary battery to the motor side and release of the connection and one or more auxiliary connecting-releasing parts that perform connection of the one or more auxiliary secondary batteries to the motor side and release of the connection, as the connecting-releasing parts, the electric vehicle further includes a battery device control unit that controls the main connecting-releasing part so that the main secondary battery is connected to the motor side, and controls the one or more auxiliary connecting-releasing parts so that usable auxiliary secondary batteries that are secondary batteries that are not set as the used secondary batteries out of the one or more auxiliary secondary batteries are sequentially switched one by one and are connected to the motor side, and the total allowable discharge electric energy setting unit is a unit that sets the total allowable discharge electric energy when the vehicle travels by the power from the motor in a state in which the main secondary battery is connected to the motor side, and one of the usable auxiliary secondary batteries is connected to the motor side. In the embodiment of the electric vehicle of the invention, the battery device is a device having a main step-up/down circuit that exchanges electric power with regulation of a voltage between a main battery voltage system connected to the main secondary battery and a high voltage system at the motor side, and an auxiliary step-up/down circuit that exchanges electric power with regulation of a voltage between an auxiliary battery voltage system connected to the one or more auxiliary secondary batteries and the high voltage system at the motor side, and the battery device control unit is a unit that controls the main connecting-releasing part and the main step-up/down circuit so that the main secondary battery is connected to the motor side and electric power from the main secondary battery is supplied to the motor, and controls the auxiliary connecting-releasing part and the auxiliary step-up/down circuit so that the usable auxiliary second batteries are sequentially switched one by one and are connected to the motor side, and electric power from the secondary battery connected to the motor side out of the usable auxiliary secondary batteries is supplied to the motor.

In still another preferable application of the electric vehicle of the invention, the electric vehicle may further include: an information reporting system that reports the set total allowable discharge electric energy and/or a travelable distance by the total allowable discharge electric energy that is obtained from the set total allowable discharge electric energy. This arrangement enables to report the total allowable discharge electric energy, and the travelable distance by the total allowable discharge electric energy.

In one preferable application of the electric vehicle of the invention, the electric vehicle may further include: an internal combustion engine; a generator capable of exchanging electric power with the secondary battery that is connected to the motor side out of the plurality of secondary batteries, and capable of inputting and outputting power; a planetary gear mechanism with three rotation elements connected to three shafts that are an output shaft of the internal combustion engine, a rotating shaft of the generator, and a driveshaft linked to an axle; and a drive control system that controls the internal combustion engine, the generator and the motor so that the vehicle travels with priority put on motor travel out of the motor travel for traveling by using only power that is input and output from the motor and hybrid travel for traveling by using power that is output from the internal combustion engine and the power that is input and output from the motor, when the usable secondary battery is present.

According to another aspect, the present invention is directed to a method for setting a total allowable discharge electric energy in an electric vehicle for setting the total allowable discharge electric energy that is an electric energy allowed to be discharged in a whole of a battery device in the electric vehicle including a motor that outputs power for travelling, a battery device having a plurality of secondary batteries capable of exchanging electric power with the motor, and connecting-releasing parts that perform connection of each of the plurality of secondary batteries to the motor side, and release of the connection, and a charger that is connected to an external power supply and charges the plurality of secondary batteries by using electric power from the external power supply in a state of system shutdown, the method for setting a total allowable discharge electric energy includes:

(a) setting the secondary battery with an accumulated charge amount that is an electric energy capable of being discharged reaching a preset accumulated charge amount or less out of the plurality of secondary batteries, as a used secondary battery; and (b) setting the total allowable discharge electric energy without reflecting an allowable discharge electric energy that is an electric energy allowed to be discharged with respect to the used secondary battery, when the vehicle travels by the power from the motor in a state in which at least one of usable secondary batteries that are the secondary batteries that are not set as the used secondary battery out of the plurality of secondary batteries is connected to the motor side.

In the method for setting a total allowable discharge electric energy in an electric vehicle according to this aspect of the invention, the secondary battery with an accumulated charge amount that is an electric energy capable of being discharged reaching a preset accumulated charge amount or less out of the plurality of secondary batteries is set as a used secondary battery, and the total allowable discharge electric energy that is an electric energy that is allowed to be discharged in the whole of the battery device is set without reflecting the allowable discharge electric energy that is the electric energy allowed to be discharged with respect to the used secondary battery, when the vehicle travels by the power from the motor in a state in which at least one of the usable secondary batteries that are the secondary batteries that are not set as the used secondary batteries out of the plurality of secondary batteries is connected to the motor side. The accumulated charge amount sometimes varies even when the secondary battery is not connected to the motor side, depending on the property of the secondary battery, and therefore, the accumulated charge amount of the used secondary battery sometimes varies to vary the allowable discharge electric energy of the used secondary battery, but the total allowable discharge electric energy is set without reflecting the allowable discharge electric energy with respect to the used secondary battery when the vehicle travels by the power from the motor in the state in which at least one of the usable secondary batteries is connected to the motor side, whereby the total allowable discharge electric energy can be more properly set as compared with the electric vehicle that sets the total allowable discharge electric energy with reflection of the allowable discharge electric energy of the used secondary battery.

In one preferable application of the method for setting a total allowable discharge electric energy in an electric vehicle of the invention, step (b) is a step of setting a difference between an accumulated charge amount of the usable secondary battery and the preset accumulated charge amount as the allowable discharge electric energy with respect to the usable secondary battery, setting value 0 as the allowable discharge electric energy with respect to the used secondary battery, and setting a sum of the respective allowable discharge electric energies of the plurality of secondary batteries as the total allowable discharge electric energy.

MODES FOR CARRYING OUT THE INVENTION

One mode for carrying out the invention is discussed below as a preferred embodiment.

Figure 1:
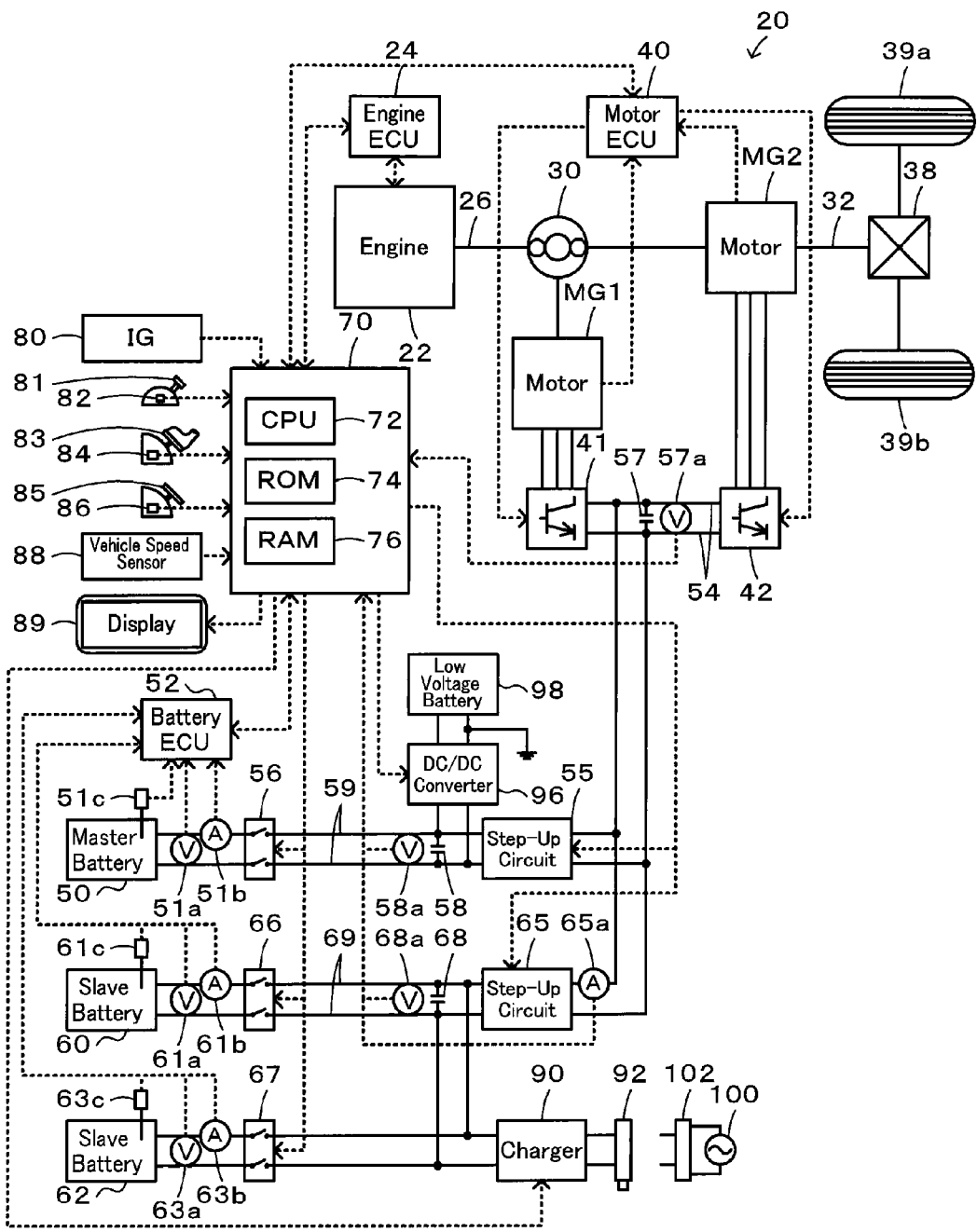
FIG. 1 is a configuration diagram showing an outline of a configuration of a hybrid vehicle 20 as one embodiment of the present invention.

FIG. 1 schematically illustrates the configuration of a hybrid vehicle 20 in one embodiment according to the invention. As illustrated, the hybrid vehicle 20 of the embodiment includes an engine 22 that consumes a fuel such as gasoline or light oil, an engine electronic control unit (hereafter referred to as engine ECU) 24 that controls the engine 22, a planetary gear 30 that has a carrier connected to a crank shaft 26 of the engine 22 and a ring gear connected to driveshaft 32 linked to driving wheels 39a and 39b via a differential gear 38, a motor MG1 that is constructed as a synchronous motor generator and has a rotor connected to the sun gear of the planetary gear 30, a motor MG2 that is constructed as a synchronous motor generator and has a rotor connected to the driveshaft 32, inverters 41 and 42 each for driving the motors MG1 and MG2, a motor electronic control unit (hereafter referred to as motor ECU) 40 that controls the motors MG1 and MG2 by performing switching control of non-illustrated switching elements in the inverters 41 and 42, a master battery 50 and slave batteries 60 and 62 that are each constructed as lithium-ion secondary batteries, a master side step-up circuit 55 that is connected to power lines (hereafter referred to as first low-voltage system power lines) 59 where the master battery 50 is connected via a system main relay 56 and power lines (hereafter referred to as high-voltage system power lines) 54 where the inverters 41 and 42 are connected and steps up the voltage of electric power from the master battery 50 to supply the electric power to the side of the inverters 41 and 42, a slave side step-up circuit 65 that is connected to power lines (hereafter referred to as second low-voltage system power lines) 69 where the slave batteries 60 and 62 are each connected via system main relays 66 and 67 and the high-voltage system power lines 54 and steps up the voltage of electric power from a slave battery (hereafter referred to as connection slave battery) currently connected to the second low-voltage system power lines 69 between the slave batteries 60 and 62 to supply the electric power to the side of the inverters 41 and 42, a battery electronic control unit (hereafter referred to as battery ECU) 52 that controls the master battery 50 and the slave batteries 60 and 62, a low-voltage battery 98 that is connected to the first low-voltage system power lines 59 via DC-to-DC converter 96, a charger 90 that is connected to the second low-voltage system power lines 69, a vehicle side connector 92 that is connected to the charger 90 and capable of connecting to an external power supply side connector 102 connected to an alternating external power supply (for example, a domestic power supply (AC 100V)) 100 as a power supply outside the hybrid vehicle 20, and a hybrid electronic control unit 70 that communicates with the engine ECU 24, the motor ECU 40, and the battery ECU 52 and controls the operations of the whole hybrid vehicle 20. The charger 90 includes a charging relay that makes connection and disconnection between the second low-voltage system power lines 69 and the vehicle side connector 92, an AC-to-DC converter that converts AC power from the external power supply 100 to DC power, and a DC-to-DC converter that regulates the voltage of the DC power converted by the AC-to-DC converter to supply the power to the second low-voltage system power lines 69. For convenience of explanation, the side of the inverters 41 and 42 from the master side step-up circuit 55 and the slave side step-up circuit 65 is described as a high-voltage system, the side of the master battery 50 from the master side step-up circuit 55 is described as a first low-voltage system, and the side of the slave batteries 60 and 62 from the slave side step-up circuit 65 is described as a second low-voltage system hereafter.

The battery ECU 52 inputs diverse signals required for control of the master battery 50 and the slave batteries 60 and 62, for example, an inter-terminal voltage Vb1 measured by a voltage sensor 51a disposed between terminals of the master battery 50, a charge-discharge current Ib1 measured by a current sensor 51b attached to an output terminal at the positive pole side of the master battery 50, a battery temperature Tb1 measured by a temperature sensor 51c attached to the master battery 50, inter-terminal voltages Vb2 and Vb3 measured by voltage sensors 61a and 63a disposed respectively between terminals of the slave batteries 60 and 62, charge-discharge currents Ib2 and Ib3 measured by current sensors 61b and 63b attached respectively to output terminals at the positive pole side of the slave batteries 60 and 62, and a battery temperature Tb2 and Tb3 measured by temperature sensors 61c and 63c attached respectively to the slave batteries 60 and 62. The battery ECU 52 outputs data relating to each state of the master battery 50 and the slave batteries 60 and 62 to the hybrid electronic control unit 70 via communication according to the requirements. The battery ECU 52 performs various arithmetic operations for management and control of the master battery 50. An accumulated charge amount SOC1 as an electric energy that can be discharged from the master battery 50 is calculated from an integrated value of the charge-discharge current Ib1 measured by the current sensor 51b. An input limit Win1 as an allowable charging electric power to be charged in the master battery 50 and an output limit Wout1 as an allowable discharging electric power to be discharged from the master battery 50 are set corresponding to the calculated accumulated charge amount SOC1 and the battery temperature Tb1. The battery ECU 52 performs various arithmetic operations for management and control of the slave batteries 60 and 62. Accumulated charge amounts SOC2 and SOC3 as an electric energy that can be discharged from the slave batteries 60 and 62 are respectively calculated from integrated values of the charge-discharge currents Ib2 and Ib3 measured by the current sensors 61b and 63b. Input limits Win2 and Win3 as allowable charging electric powers to be charged in the slave batteries 60 and 62 and output limits Wout2 and Wout3 as allowable discharging electric powers to be discharged from the slave batteries 60 and 62 are set corresponding to the calculated accumulated charge amounts SOC2 and SOC3 and the battery temperature Tb2 and Tb3. A concrete procedure of setting the input and output limits Win1 and Wout1 of the master battery 50 sets base values of the input limit Win1 and the output limit Wout1 corresponding to the battery temperature Tb1, specifies an input limit correction factor and an output limit correction factor corresponding to the accumulated charge amount SOC1 of the master battery 50, and multiplies the base values of the input limit Win1 and the output limit Wout1 by the specified input limit correction factor and output limit correction factor to determine the input limit Win1 and the output limit Wout1 of the master battery 50. The input and output limits Win2 and Wout2 of the slave battery 60 and the input and output limits Win3 and Wout3 of the slave battery 62 are set as well as the input and output limits Win1 and Wout1 of the master battery 50. In the embodiment, the accumulated charge capacities of the master battery 50 and the slave batteries 60 and 62 are same.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: a voltage (voltage of the high-voltage system) VH measured by a voltage sensor 57a disposed between terminals of the smoothing capacitor 57 connected to the positive electrode bus line and the negative electrode bus line of the high-voltage system power lines 54, a voltage (voltage of the first battery voltage system) VL1 measured by a voltage sensor 58a disposed between terminals of the smoothing capacitor 58 connected to the positive electrode bus line and the negative electrode bus line of the first low-voltage system power lines 59, a voltage (voltage of the second battery voltage system) VL2 measured by a voltage sensor 68a disposed between terminals of the smoothing capacitor 68 connected to the positive electrode bus line and the negative electrode bus line of the second low-voltage system power lines 69, an ignition signal from an ignition switch 80, a slave side current Ibs that is from a current sensor 65a attached to the terminal of the high-voltage system power lines 54 sides of the slave side step-up circuit 65, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 outputs various signals via the output port: switching control signals to switching elements of the master side step-up circuit 55, switching control signals to switching elements of the slave side step-up circuit 65, driving signals to the system main relays 56, 66 and 67, display signals to the display 89 displaying information and control signals to the charger 90. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52 as previously indicated.

The hybrid vehicle 20 of the embodiment thus constructed calculates a torque demand to be output to the driveshaft 32, based on observed values of a vehicle speed V and an accelerator opening Acc, which corresponds to a driver's step-on amount of the accelerator pedal 83. The engine 22 and the motors MG1 and MG2 are subjected to operation control to output a required level of power corresponding to the calculated torque demand to the driveshaft 32. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the driveshaft 32. The charge-discharge drive mode controls the operations of the engine 22 to output a quantity of power equivalent to the sum of the required level of power and a quantity of electric power consumed by charging any of the master battery 50 and the slave batteries 60 and 62 or supplied by discharging any of the master battery 50 and the slave batteries 60 and 62, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the driveshaft 32, simultaneously with charge or discharge of any of the master battery 50 and the slave batteries 60 and 62. The motor drive mode stops the operations of the engine 22 and drives and controls the motor MG2 to output a quantity of power equivalent to the required level of power to the driveshaft 32. Both of the torque conversion drive mode and the charge-discharge drive mode are a mode that controls the engine 22 and the motors MG1 and MG2 to output the required level of power to the driveshaft 32 with the operation of the engine 22. Therefore, the torque conversion drive mode and the charge-discharge drive mode are collectively considered as an engine drive mode.

In the hybrid vehicle 20 of the embodiment, upon connection between the external power supply side connector 102 and the vehicle side connector 92 after system shutdown of the hybrid vehicle 20 at home or at a predetermined charging point, the charging relay in the charger 90 is switched to ON. The master battery 50 and the slave batteries 60 and 62 are then brought to each fully charged state or a preset charge state that is less charged state than the fully charged state, by switching ON/OFF the system main relays 56, 66 and 67 and controlling the master side step-up circuit 55, the slave side step-up circuit 65, and the AC-to-DC converter and DC-to-DC converter in the charger 90. When the system of the hybrid vehicle 20 is started up (by ignition on) at the state of the master battery 50 and the slave batteries 60 and 62 being charged enough as described and vehicle travelling is started, it is enabled to drive the hybrid vehicle 20 for some extent of distance (time) with the motor travel using electric power from the master battery 50 and the slave batteries 60 and 62. In the hybrid vehicle 20 of the embodiment, the slave batteries 60 and 62 are included in addition to the master battery 50, and it is thus enabled to have a longer travelling distance (travelling time) for driving the hybrid vehicle 20 with the motor travel in comparison with a vehicle only including the master battery 50.

Figure 2:
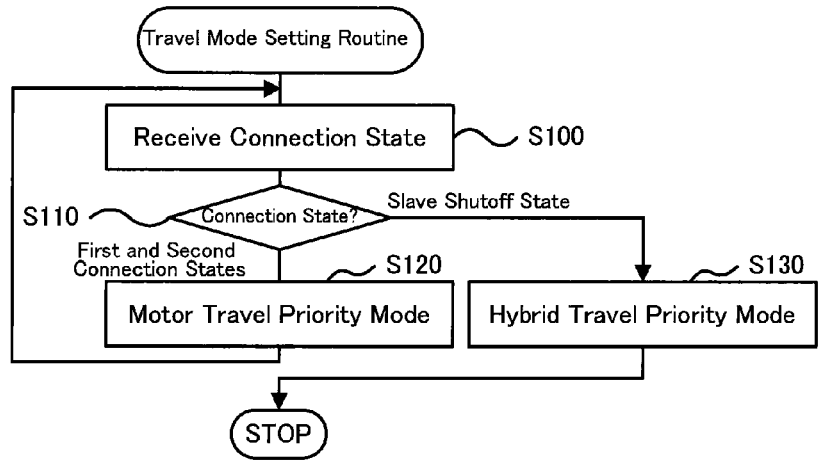
FIG. 2 is a flowchart showing one example of a travel mode setting routine that is executed by a hybrid electronic control unit 70 of the embodiment.
Figure 3:
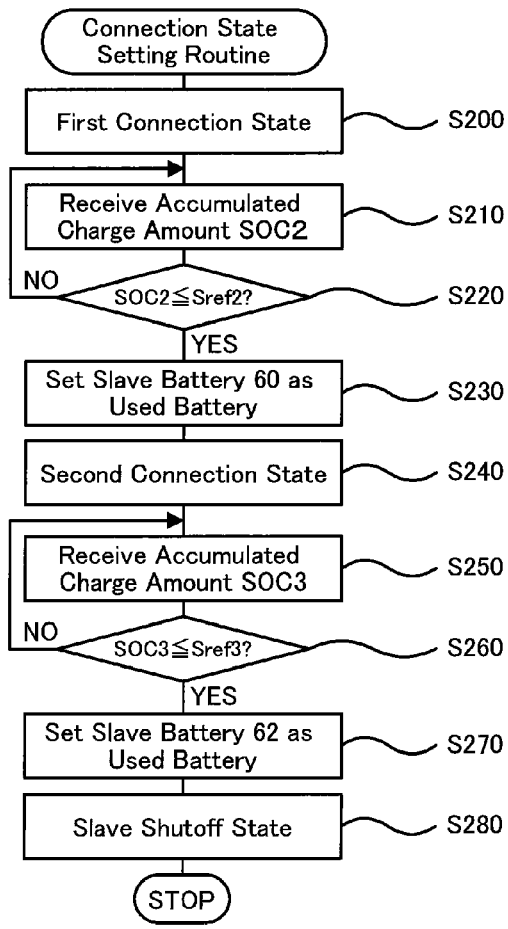
FIG. 3 is a flowchart showing one example of a connection state setting routine that is executed by the hybrid electronic control unit 70 of the embodiment.

FIG. 2 is a flowchart showing one example of a travel mode setting routine that is executed by the hybrid electronic control unit 70 of an embodiment after system is started up. When the system is started up and the routine is executed, the CPU 72 of the hybrid electronic control unit 70 inputs the connection state that is set by a connection state setting routine that is illustrated in FIG. 3 (step S100), checks the input connection state (step S110), sets the motor travel priority mode of traveling with priority given to travel according to a motor drive mode (motor travel) as a travel mode at the time of a first connection state (a state in which the master battery 50 and the master side step-up circuit 55 are connected, the slave battery 60 and the slave side step-up circuit 65 are connected, and connection of the slave battery 62 and the slave side step-up circuit 65 is released), or a second connection state (a state in which the master battery 50 and the master side step-up circuit 55 are connected, the slave battery 62 and the slave side step-up circuit 65 are connected, and the connection of the slave battery 60 and the slave side step-up circuit 65 is released) (step S120) and returns to step S100. At the time of a slave shutoff state (a state in which the master battery 50 and the master side step-up circuit 55 are connected, and connection of both the slave batteries 60 and 62 and the slave side step-up circuit 65 is released) in step S110, the CPU 72 sets a hybrid travel priority mode of travelling with priority put on travel according to an engine drive mode (hybrid travel) as the travel mode (step S130), and terminates the present routine. In the embodiment, when the hybrid travel priority mode is set as the travel mode, a travel power Pdrv* that is required for travel is calculated by multiplying torque demand Tr* based on an accelerator opening Acc and a vehicle speed V by a rotation speed of the driveshaft 32 (rotation speed obtained by multiplying a rotation speed Nm2 of the motor MG2 or the vehicle speed V by a conversion factor), a power demand Pe* as the sum of the calculated travel power Pdrv* and a charge/discharge power demand Pb* of the master battery 50 is compared with a threshold value Phv that is set in advance as power slightly larger than the minimum power capable of operating the engine 22 with high efficiency, motor travel is performed when the power demand Pe* is the threshold value Phv or less, and hybrid travel is performed when the power demand Pe* is larger than the threshold value Phv. Thereby, the vehicle can travel efficiently. Further, when the motor travel priority mode is set as the travel mode, the sum of the output limit Wout1 of the master battery 50 and the output limit of the connected slave battery (the sum of the output limit Wout1 of the master battery 50 and the output limit Wout2 of the slave battery 60 at the time of the first connection state, and the sum of the output limit Wout1 of the master battery 50 and the output limit Wout3 of the slave battery 62 at the time of the second connection state) is set as an output limit Wout, the travel power Pdrv* is calculated by multiplying the torque demand Tr* based on the accelerator opening Acc and the vehicle speed V by the rotation speed of the driveshaft 32, and motor travel is performed when the calculated travel power Pdrv* is the output limit Wout or less, whereas when the travel power Pdrv* is larger than the output limit Wout, hybrid travel is performed. The output limit Wout at the time when the motor travel priority mode is set as the travel mode is usually larger as compared with the threshold value Phv, and therefore, when the motor travel priority mode is set as the travel mode by such control, motor travel is easily allowed as compared with the time when the hybrid travel priority mode is set as the travel mode. Consequently, motor travel can be easily performed until the accumulated charge amounts SOC1, SOC2 and SOC3 of the master battery 50, and the slave batteries 60 and 62 become small.

In the hybrid vehicle 20 of the embodiment, in the case that the hybrid vehicle 20 is driven in the motor travel priority mode, each connection state of the master battery 50 and the slave batteries 60 and 62 is switched by a connection state setting routine shown as one example in FIG. 3. This routine is executed by the hybrid electronic control unit 70. In the connection state setting routine, when the vehicle system is started up (by ignition on) at the state of the master battery 50 and the slave batteries 60 and 62 being charged enough by the charger 90 using electric power from the external power supply 100 during the system shutdown, the CPU 72 of the hybrid electronic control unit 70 switches the system main relays 56 and 66 to ON and leads to a first connection state (step S200). The hybrid vehicle 20 is driven in the motor travel priority mode with controlling the master side step-up circuit 55 and the slave side step-up circuit 65 by a step-up circuit control described later in which the master side step-up circuit 55 and the slave side step-up circuit 65 are controlled so that the accumulated charge amount SOC2 of the slave battery 60 decreases faster than the accumulated charge amount SOC1 of the master battery 50. When the accumulated charge amount SOC2 of the slave battery 60 becomes less than or equal to a preset accumulated charge amount Sref2 (steps S210 and S220), set slave battery 60 as used battery (step S230), the CPU 72 switches the system main relay 66 to OFF and the system main relay 67 to ON to change from the first connection state to a second connection state (step S240). Here, as the preset accumulated charge amount Sref2, the accumulated charge amount with which the ratio of the accumulated charge amount SOC2 of the slave battery 60 to the accumulated charge capacity becomes a preset ratio (for example, 20% or 23%, 25% or the like) can be used. While the CPU 72 controls the master side step-up circuit 55 and the slave side step-up circuit 65 by controlling the step-up circuits so that the timing at which the accumulated charge amount SOC1 of the master battery 50 becomes a preset accumulated charge amount Sref1 or less, and the timing at which the accumulated charge amount SOC3 of the slave battery 62 becomes a preset accumulated charge amount Sref3 or less become the same, the vehicle travels according to the motor travel priority mode, and when the accumulated charge amount SOC3 of the slave battery 62 reaches the preset accumulated charge amount Sref3 or less (the accumulated charge amount SOC1 of the master battery 50 reaches the preset accumulated charge amount Sref1 or less)(steps S250 and S260), the CPU 72 sets the slave battery 62 as a used battery (step S270). The second connection state is changed to the slave shutoff state in which the system main relay 67 is switched off (step S280), and the present routine is terminated. Here, as the preset accumulated charge amount Sref1, the accumulated charge amount with which the ratio of the accumulated charge amount SOC1 of the master battery 50 to the accumulated charge capacity is a preset ratio (for example, 32%, 35%, 37% or the like) can be used, and as the preset accumulated charge amount Sref3, the accumulated charge amount with which the ratio of the accumulated charge amount SOC3 of the slave battery 62 to the accumulated charge capacity is a preset ratio (for example, 20%, 23%, 25% or the like) can be used. Further, in the slave shutoff state, the vehicle travels in the hybrid travel priority mode while intermittently operating the engine 22 based on the power demand which is required of the vehicle. In the embodiment, in order to reduce the number of on-off times of the system main relays 66 and 67 while receiving and outputting power from the motors MG1 and MG2 (during travel), with respect to the used battery, the corresponding system main relay is not switched on until charge is performed by using electric power from the external power supply 100 after the system is shut down (ignition off).

Figure 4:
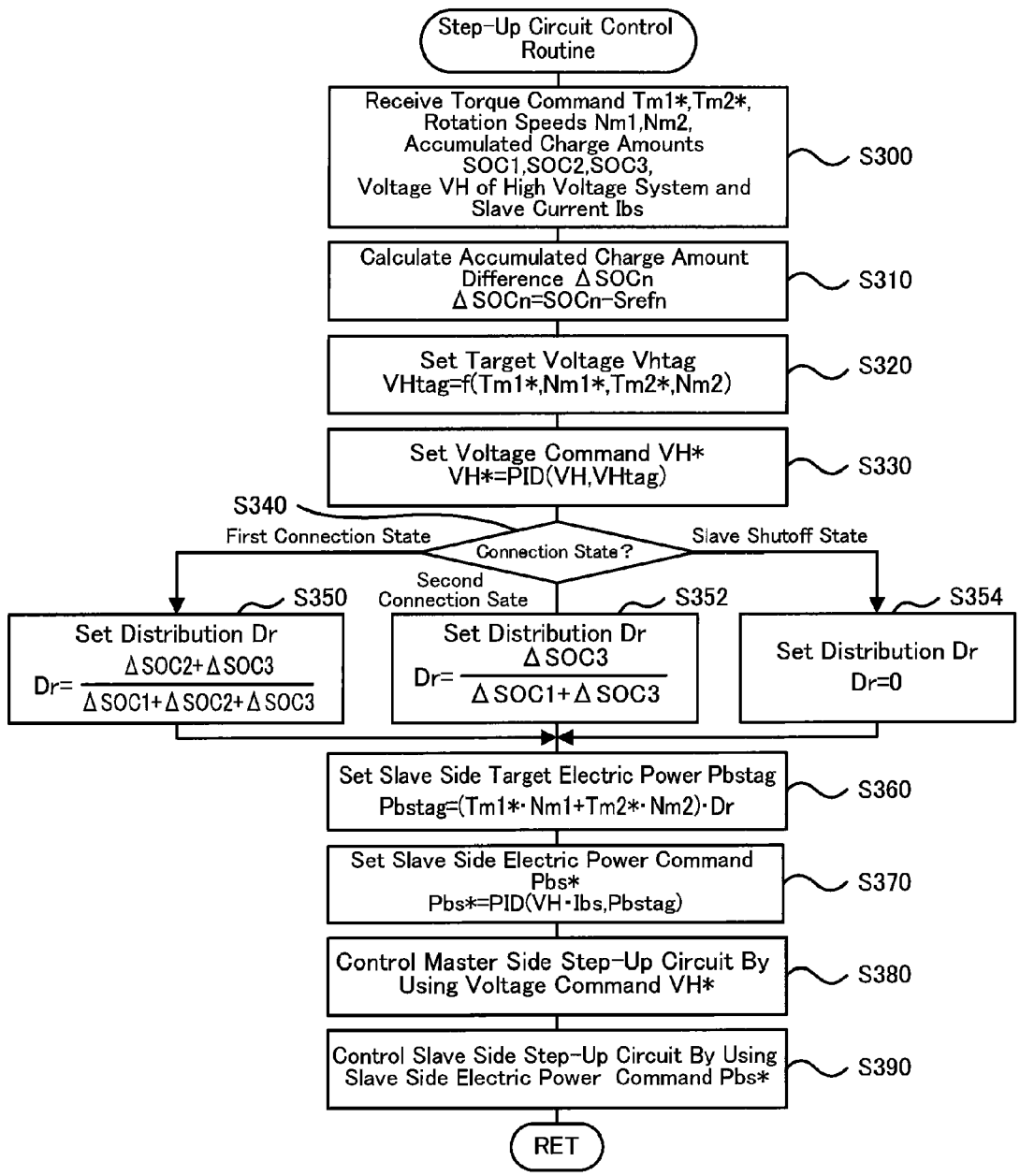
FIG. 4 is a flowchart showing one example of a step-up circuit control routine that is executed by the hybrid electronic control unit 70 of the embodiment.

In the hybrid vehicle 20 of the embodiment, the master side step-up circuit 55 and the slave side step-up circuit 65 are controlled by a step-up circuit control routine shown as one example in FIG. 4. This routine is executed repeatedly at preset time intervals (for example, at every several msec). In the step-up circuit control routine, the CPU 72 of the hybrid electronic control unit 70 inputs various data required for control, for example, torque commands Tm1* and Tm2* of the motors MG1 and MG2, the rotation speeds Nm1* and Nm2* of the motors MG1 and MG2, the accumulated charge amount SOC1 of the maser battery 50, the accumulated charge amounts SOC2 and SOC3 of the slave batteries 60 and 62, the voltage VH of the high-voltage system from the voltage sensor 57a, and the slave side current Ibs from the current sensor 65a (step S300). The CPU 72 calculates accumulated charge amount differences ΔSOC1, ΔSOC2 and ΔSOC3 from subtracting preset accumulated charge amounts Sref1, Sref2 and Sref3 respectively from the accumulated charge amount SOC1 of the master battery 50 and the accumulated charge amounts SOC2 and SOC3 of the slave batteries 60 and 62 (step S310). The torque commands Tm1* and Tm2* of the motor MG1 and MG2 are set in a drive control routine not illustrated and are input. The rotation speeds Nm1 and Nm2 of the motors MG1 and MG2 are computed from the rotational positions of the rotors in the motors MG1 and MG2 detected by the rotational position detection sensors and 44 and are input from the motor ECU 40 by communication. The accumulated charge amount SOC1 of the master battery 50 and the accumulated charge amounts SOC2 and SOC3 of the slave batteries 60 and 62 are computed from the integrated values of the charge-discharge currents Ib1, Ib2 and Ib3 measured by the current sensors 51b, 61b and 63b and are input from the battery ECU 52 by communication.

The CPU 72 subsequently sets a target voltage VHtag of the high-voltage system power lines 54 based on the torque commands Tm1* and Tm2* and the rotation speeds Nm1 and Nm2 of the motors MG1 and MG2 (step S320), and sets a voltage command VH* used for control of the master step-up circuit 55 by voltage feedback control to bring the voltage VH of the high-voltage system to the target voltage VHtag (step S330). The target VHtag is set to the larger one between a voltage enabling to drive the motor MG1 at the target operation point (the torque command Tm1*, the rotation speed Nm1) of the motor MG1 and a voltage enabling to drive the motor MG2 at the target operation point (the torque command Tm2*, the rotation speed Nm2).

The CPU 72 next determines the connection state set in the connection state setting routine of FIG. 3 (step S340). At the first connection state, a distribution ratio Dr is calculated from the accumulated charge amount differences ΔSOC1, ΔSOC2 and ΔSOC3 of the master battery 50 and the slave batteries 60 and 62, according to Equation (1) given below (step S350). The distribution ratio Dr is a ratio of electric power to be supplied to the side of the motor MG1 and MG2 from the slave battery 60 to the sum of electric power to be supplied to the side of the motor MG1 and MG2 from the master battery 50 and the electric power to be supplied to the side of the motor MG1 and MG2 from the slave battery 60. At the second connection state, the distribution ratio Dr is calculated from the accumulated charge amount differences ΔSOC1 and ΔSOC3 of the master battery 50 and the slave batteries 62, according to Equation (2) given below (step S352). At the slave shutoff state, the distribution ratio Dr is set to value 0 (step S354). The reason for calculating the distribution ratio Dr in this way is to have a timing when the accumulated charge amount SOC1 of the master battery 50 becomes the preset accumulated charge amount Sref1 as the same timing as a timing when the accumulated charge amount SOC3 of the slave battery 62 becomes the preset accumulated charge amount Sref3.

$$Dr=(\Delta SOC2+\Delta SOC3)/(\Delta SOC1+\Delta SOC2+\Delta SOC3) \quad (1)$$

$$Dr=\Delta SOC3/(\Delta SOC1+\Delta SOC3) \quad (2)$$

Thus, when the distribution ratio Dr is set, the CPU 72 calculates a slave side target power Pbstag to be supplied to the side of the motors MG1 and MG2 from the side of the slave batteries 60 and 62, from multiplying the sum of power consumptions in the motors MG1 and MG2 by the distribution ratio Dr according to Equation (3) given below (step S360), and sets a slave side power command Pbs* by voltage feedback control to bring the electric power (VH·Ibs) supplied from the side of the slave batteries 60 and 62 to the slave side target power Pbstag (step S370). The CPU 72 controls the master side step-up circuit 55 so that the voltage VH of the high-voltage system power lines 54 becomes the target voltage VHtag using the voltage command VH* (step S380), and controls the slave side step-up circuit 65 so that the electric power supplied from the slave batteries 60 and to the side of the motors MG1 and MG2 becomes the slave side electric power demand Pbs* (step S390). The step-up circuit control routine is then terminated. This control enables regulation of the voltage VH of the high-voltage system power lines 54, and regulations of the electric power supplied from the master battery 50 to the side of the inverters 41 and 42 and the electric power supplied from the connection side slave battery to the side of the inverters 41 and 42.

$$Pbstag=(Tm1*·Nm1+Tm2*·Nm2)·Dr \quad (3)$$

Figure 5:
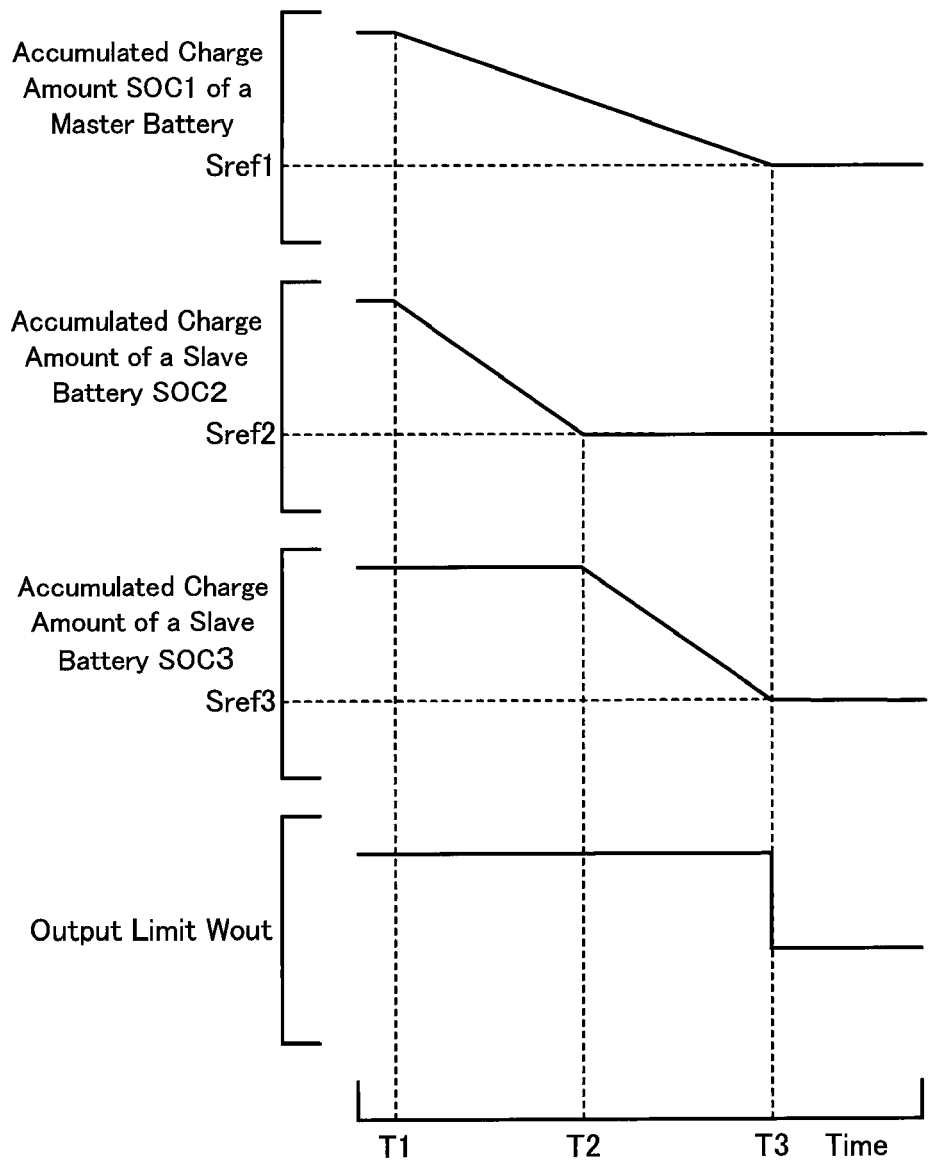
FIG. 5 is an explanatory view showing one example of change with time of an accumulated charge amount SOC1 of a master battery 50, accumulated charge amounts SOC2 and SOC3 of slave batteries 60 and 62, and an output limit Wout at a time of uniformly performing motor travel according to a motor travel priority mode.

FIG. 5 shows one set of examples of time charts of the accumulated charge amount SOC1 of the master battery 50, the accumulated charge amounts SOC2 and SOC3 of the slave batteries 60 and 62, and the output limit Wout in the case the hybrid vehicle 20 is driven equally to perform the motor travel in the motor travel priority mode. The output limit Wout is equivalent to the sum of the output limit Wout1 of the master battery 50 and the output limit of one connected slave battery, that is, equivalent to the sum of the output limit Wout1 of the master battery 50 and the output limit Wout2 of the slave battery 60 in the first connection state, equivalent to the sum of the output limit Wout1 of the master battery 50 and the output limit Wout3 of the slave battery 62 in the second connection state, and equivalent to the output limit Wout1 of the master battery 50 in the slave shutoff state. As shown in the figure, the master battery 50 and the slave battery 60 are discharged in the first connection state from the time T1 of travelling start, and both the accumulated charge amount SOC1 of the master battery 50 and the accumulated charge amount SOC2 of the slave battery 60 are decreased. The electric power supplied from the slave battery 60 to the side of the motors MG1 and MG2 is in accordance with the distribution ratio Dr calculated as shown in Equation (1) and is larger than the electric power supplied from the master battery 50 to the side of the motors MG1 and MG2. The decrease in the accumulated charge amount SOC2 of the slave battery 60 is thus faster than the decrease in the accumulated charge amount SOC1 of the master battery 50. At the time T2 when the accumulated charge amount SOC2 of the slave battery 60 reaches the preset accumulated charge amount Sref2, the first connection state is changed to the second connection state. The master battery 50 and the slave battery 62 are discharged, and both the accumulated charge amount SOC1 of the master battery 50 and the accumulated charge amount SOC3 of the slave battery 62 are decreased. At this time, the electric power supplied from the slave battery 62 to the side of the motors MG1 and MG2 is in accordance with the distribution ratio Dr calculated as shown in Equation (2) and is larger than the electric power supplied from the master battery 50 to the side of the motors MG1 and MG2. The decrease in the accumulated charge amount SOC3 of the slave battery 62 is thus faster than the decrease in the accumulated charge amount SOC1 of the master battery 50. At the time T3 when the accumulated charge amount SOC1 of the master battery 50 reaches the preset accumulated charge amount Sref1 and the accumulated charge amount SOC3 of the slave battery 62 reaches the preset accumulated charge amount Sref3, the second connection state is changed to the slave shutoff state and the motor travel priority mode is changed to the hybrid travel priority mode.

Figure 6:
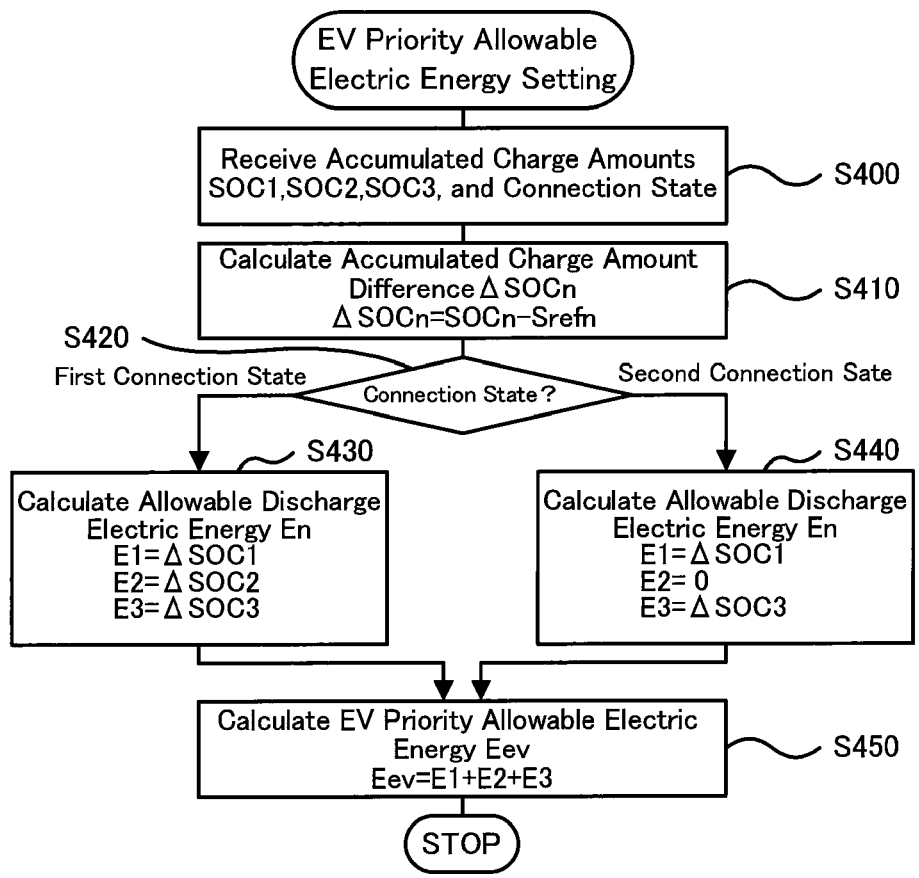
FIG. 6 is a flowchart showing one example of an EV priority allowable electric energy setting routine that is executed by the hybrid electronic control unit 70.

The description regards the processing of setting an EV priority allowable electric energy Eev that is an electric energy (energy) that allows continuation of the motor travel priority mode. FIG. 6 is a flowchart showing one example of an EV priority allowable electric energy setting routine that is executed by the hybrid electronic control unit 70. The routine is repeatedly executed every preset time (for example, every several msec) when the motor travel priority mode is set as a travel mode.

When the EV priority allowable electric energy setting routine is executed, the CPU 72 of the hybrid electronic control unit 70 first inputs the connection state that is set by the connection state setting routine of FIG. 3, and also inputs the accumulated charge amount SOC1 of the master battery 50, and the accumulated charge amounts SOC2 and SOC3 of the slave batteries 60 and 62 similarly to the processing of step S300 of the step-up circuit control routine of FIG. 4 (step S400), and calculates accumulated charge amount differences ΔSOC1, ΔSOC2 and ΔSOC3 by subtracting the preset accumulated charge amounts Sref1, Sref2 and Sref3 respectively from the accumulated charge amount SOC1 of the master battery 50 and the accumulated charge amounts SOC2 and SOC3 of the slave batteries 60 and 62 (step S410).

Subsequently, the CPU 72 checks the connection state (step S420), and at the time of the first connection state, the CPU 72 sets the accumulated charge amount differences ΔSOC1, ΔSOC2 and ΔSOC3 respectively as allowable discharge electric energies E1, E2 and E3 that are the electric energies that are allowed to be discharged with respect to the master battery 50, and the slave batteries 60 and 62 at the time when the vehicle travels in the motor travel priority mode (step S430), and sets the sum of the allowable discharge electric energies E1, E2 and E3 as the EV priority allowable electric energy Eev that is the electric energy allowed to be discharged as a whole of the master battery 50 and the slave batteries 60 and 62 when the vehicle travels in the motor travel priority mode (step S450). The present routine is then terminated. Further, at the time of the second connection state in step S420, the CPU 72 sets the accumulated charge amount differences ΔSOC1 and ΔSOC3 respectively as the allowable discharge electric energies E1 and E3 of the master battery 50 and the slave battery 62, sets value 0 as the allowable discharge electric energy E2 of the slave battery 60 (step S440), and sets the sum of the allowable discharge electric energies E1, E2 and E3 as the EV priority allowable electric energy Eev (step S450). The present routine is then terminated. First, as described above, in the embodiment, the used battery is not connected to the inverters 41 and 42 sides until the battery is charged at the time of system shutdown, and therefore, considering the time from the system startup to system shutdown, the slave battery 60 is not connected to the motors MG1 and MG2 sides (inverters 41 and 42 sides) after the connection state becomes the second connection state. Further, the accumulated charge amount of the used battery may slightly vary due to the property of the slave battery even when the battery is not connected to the motors MG1 and MG2 sides. From these matters, if the accumulated charge amount differences ΔSOC1, ΔSOC2 and ΔSOC3 are respectively set as the allowable discharge electric energies E1, E2 and E3 at the time of the second connection state similarly to the time of the first connection state, the EV priority allowable electric energy Eev sometimes varies due to variation of the accumulated charge amount SOC2 of the slave battery 60. In contrast with this, in the embodiment, value 0 is set as the allowable discharge electric energy E2 of the slave battery 60 which is set as the used battery at the time of the second connection state, whereby the EV priority allowable electric energy Eev can be more optimally set. The EV priority allowable electric energy Eev that is set more optimally in this manner reaches value 0 at the timing when the accumulated charge amount SOC1 of the master battery 50 reaches the preset accumulated charge amount Sref1 or less, and the accumulated charge amount SOC3 of the slave battery 62 reaches the preset accumulated charge amount Sref3 or less. When the EV priority allowable electric energy Eev is set in this manner, the hybrid electronic control unit 70 displays on the display 89 the information of the set EV priority allowable electric energy Eev, an EV priority allowable distance Lev that is a travelable distance in the motor travel priority mode, which is obtained as the product of the EV priority allowable electric energy Eev and the travel distance per unit electric energy which is set in advance, and the like, and outputs the information by a voice from the speaker not illustrated, in accordance with necessity. Thereby, the EV priority allowable electric energy Eev and the EV priority allowable distance Lev can be reported to the driver.

According to the hybrid vehicle 20 of the embodiment described above, at the time of the first connection state in which the master battery 50 and the slave battery 60 are connected to the motors MG1 and MG2 sides (inverters 41 and 42 sides), the accumulated charge amount differences ΔSOC1, ΔSOC2 and ΔSOC3 of the master battery 50 and the slave batteries 60 and 62 are set as the allowable discharge electric energies E1, E2 and E3, the sum of the set allowable discharge electric energies E1, E2 and E3 is set as the EV priority allowable electric energy Eev that is the electric energy allowed to be discharged as the whole of the master battery 50 and the slave batteries 60 and 62 when the vehicle travels in the motor travel priority mode, and when the accumulated charge amount SOC2 of the slave battery 60 reaches the preset accumulated charge amount Sref2 or less, the slave battery 60 is set as the used secondary battery, whereas in the second connection state in which the master battery 50 and the slave battery 62 are connected to the motors MG1 and MG2 sides, the accumulated charge amount differences ΔSOC1 and ΔSOC3 of the master battery 50 and the slave battery 62 are respectively set as the allowable discharge electric energies E1 and E3, value 0 is set as the allowable discharge electric energy E2, and the sum of the allowable discharge electric energies E1, E2 and E3 is set as the EV priority allowable electric energy Eev. Therefore, at the time of the second connection state, that is, when the used secondary battery is present, the EV priority allowable electric energy Eev can be set more optimally.

In the hybrid vehicle 20 of the embodiment, the EV priority allowable electric energy Eev is set by using the accumulated charge amount difference ΔSOC1 of the master battery 50 and the accumulated charge amount difference of the battery that is not set as the used battery out of the slave batteries 60 and 62 (the slave batteries 60 and 62 at the time of the first connection state, and the slave battery 62 at the time of the second connection state), but the EV priority allowable electric energy Eev may be set by using an accumulated charge ratio R1 that is a ratio of the accumulated charge amount SOC1 of the master battery 50 to the accumulated charge capacity, and the accumulated charge ratio of the battery that is not set as the used battery out of the slave batteries 60 and 62, in place of the accumulated charge amount difference. In the embodiment, the master battery 50, and the slave batteries 60 and 62 are constructed to have the same accumulated charge capacities. Therefore, in this case, for example, accumulated charge ratio differences ΔR1, ΔR2 and ΔR3 are calculated by subtracting the preset accumulated charge ratios Rref1, Rref2 and Rref3 corresponding to the aforementioned preset accumulated charge amounts Sref1, Sref2 and Sref3 respectively from the accumulated charge ratios R1, R2 and R3 of the master battery 50 and the slave batteries 60 and 62, and at the time of the first connection state, the EV priority allowable electric energy Eev can be set to what is obtained by multiplying the sum of the accumulated charge ratio differences ΔR1, ΔR2 and ΔR3 by the accumulated charge capacities of the master battery 50 and the slave batteries 60 and 62, whereas at the time of the second connection state, the EV priority allowable electric energy Eev can be set to what is obtained by resetting the accumulated charge ratio difference ΔR2 at value 0 and thereafter, multiplying the sum of the accumulated charge ratio differences ΔR1, ΔR2 and ΔR3 by the accumulated charge capacities of the master battery 50 and the slave batteries 60 and 62.

In the hybrid vehicle 20 of the embodiment, the information such as the EV priority allowable electric energy Eev and the EV priority allowable distance Lev that is obtained from the EV priority allowable electric energy is reported by being displayed on the display 89 and being output by a voice from the speaker not illustrated in accordance with necessity, but such report does not have to be performed.

In the hybrid vehicle 20 of the embodiment, the information such as the EV priority allowable electric energy Eev and the EV priority allowable distance Lev that is obtained from the EV priority allowable electric energy is reported by being displayed on the display 89 and being output by a voice from the speaker not illustrated in accordance with necessity, but the information may be used in setting the travel mode, and setting the connection state of the master battery 50 and the slave batteries 60 and 62 in place of, or in addition to such report. In the former case, instead of changing the travel mode from the motor travel priority mode to the hybrid travel priority mode in accordance with the connection state, the travel mode may be changed from the motor travel priority mode to the hybrid travel priority mode at the timing when the EV priority allowable electric energy Eev becomes value 0. Further, in the latter case, instead of changing the connection state from the second connection state to the slave shutoff state at the timing when the accumulated charge amount SOC3 of the slave battery 62 reaches the preset accumulated charge amount Sref3 or less in the second connection state, the connection state may be changed from the second connection state to the slave shutoff state at the timing when the EV priority allowable electric energy Eev becomes value 0 in the second connection state.

Explanation is made about the operation when the system is started up in the state in which the master battery 50 and the slave batteries 60 and 62 are sufficiently charged by the charger 90 by using the electric power from the external power supply 100 at the time of system shutdown in the hybrid vehicle 20 of the embodiment, but when the system is started up in the state in which the master battery 50 and the slave batteries 60 and 62 are not charged at the time of system shutdown, the accumulated charge amount SOC2 of the slave battery 60 is compared with the preset accumulated charge amount Sref2 and the accumulated charge amount SOC3 of the slave battery 62 is compared with the preset accumulated charge amount Sref3 when the system is started up. Subsequently, the slave battery the accumulated charge amount of which is the preset accumulated charge amount or less out of the slave batteries 60 and 62 may be set as the used battery. In this case, for example, when the slave battery 60 is set as the used battery when the system is started up, the system main relays 56 and 67 are first switched on to switch the connection state to the second connection state, and thereafter, when the accumulated charge amount SOC3 of the slave battery 62 reaches the preset accumulated charge amount Sref3 or less, the slave battery 62 may be set as a used battery to switch off the system main relay 67 to switch the state to slave shutoff state.

In the hybrid vehicle 20 of the embodiment, at the time of the second connection state, the accumulated charge amount differences ΔSOC1 and ΔSOC3 of the master batteries 50 and 62 are respectively set as the allowable discharge electric energies E1 and E3 and the allowable discharge electric energy E2 is set to value 0, whereby the sum of the allowable discharge electric energies E1, E2 and E3 is set as the EV priority allowable electric energy Eev, but at the time of the second connection state, the sum of the allowable discharge electric energies E1 and E3 may be set as the EV priority allowable electric energy Eev, since it is sufficient as long as the accumulated charge amount difference ΔSOC2 of the slave battery 60 that is set as the used battery is not reflected in the EV priority allowable electric energy Eev.

In the hybrid vehicle 20 of the embodiment, the master battery 50 and the slave batteries 60 and 62 are constructed as lithium-ion secondary batteries having the same rated capacity. This is not essential. They may be constructed as lithium-ion secondary batteries each having different rated capacity or different types of secondary batteries each having different rated capacity.

In the hybrid vehicle 20 of the embodiment, one master battery 50 and two slave batteries 60 and 62 are installed, but one master battery 50 and three or more slave batteries may be installed. In this case, when travelling with the motor travel priority mode, the master battery 50 may be connected to the side of the motors MG1 and MG2 and the three or more slave batteries may be sequentially connected to the side of the motors MG1 and MG2 as the connection state. In addition, one master battery and one slave battery may be installed, and two or more master batteries and two or more slave batteries may be installed.

In the hybrid vehicle 20 of the embodiment, one master battery 50 and two slave batteries 60 and 62 are installed, and the master battery 50 and the slave battery 60 are connected to the side of the motors MG1 and MG2 in the first connection state, while the master battery 50 and the slave battery 62 are connected to the side of the motors MG1 and MG2 in the second connection state, when travelling with the motor travel priority mode. Instead, the master battery 50 and the slave battery 62 may be connected to the side of the motors MG1 and MG2 in the first connection state, while the master battery 50 and the slave battery 60 are connected to the side of the motors MG1 and MG2 in the second connection state.

The hybrid vehicle 20 of the embodiment includes one master battery 50 and two slave batteries 60 and 62 and system main relays 56, 66 and 67, but may be any other thing that includes at least a plurality of batteries capable of exchanging electric power with the inverters 41 and 42 sides and relays that perform connection of the plurality of batteries to the respective inverters 41 and 42 sides and release of the connection without making a distinction between the master battery and the slave batteries.

The hybrid vehicle 20 of the embodiment includes the master side step-up circuit 55 that is connected to the high-voltage system power lines 54 and the first low-voltage system power lines 59, and the slave side step-up circuit 65 that is connected to the high-voltage system power lines 54 and the second low-voltage system power lines 69, but may be the hybrid vehicle that does not include the master side step-up circuit 55 and the slave side step-up circuit 65.

The hybrid vehicle 20 of the embodiment displays information such as the EV priority allowable electric energy Eev and the EV priority allowable distance Lev on the display 89 and outputs the information from the speaker not illustrated by a voice, but may be the hybrid vehicle that does not perform such processing.

Figure 7:
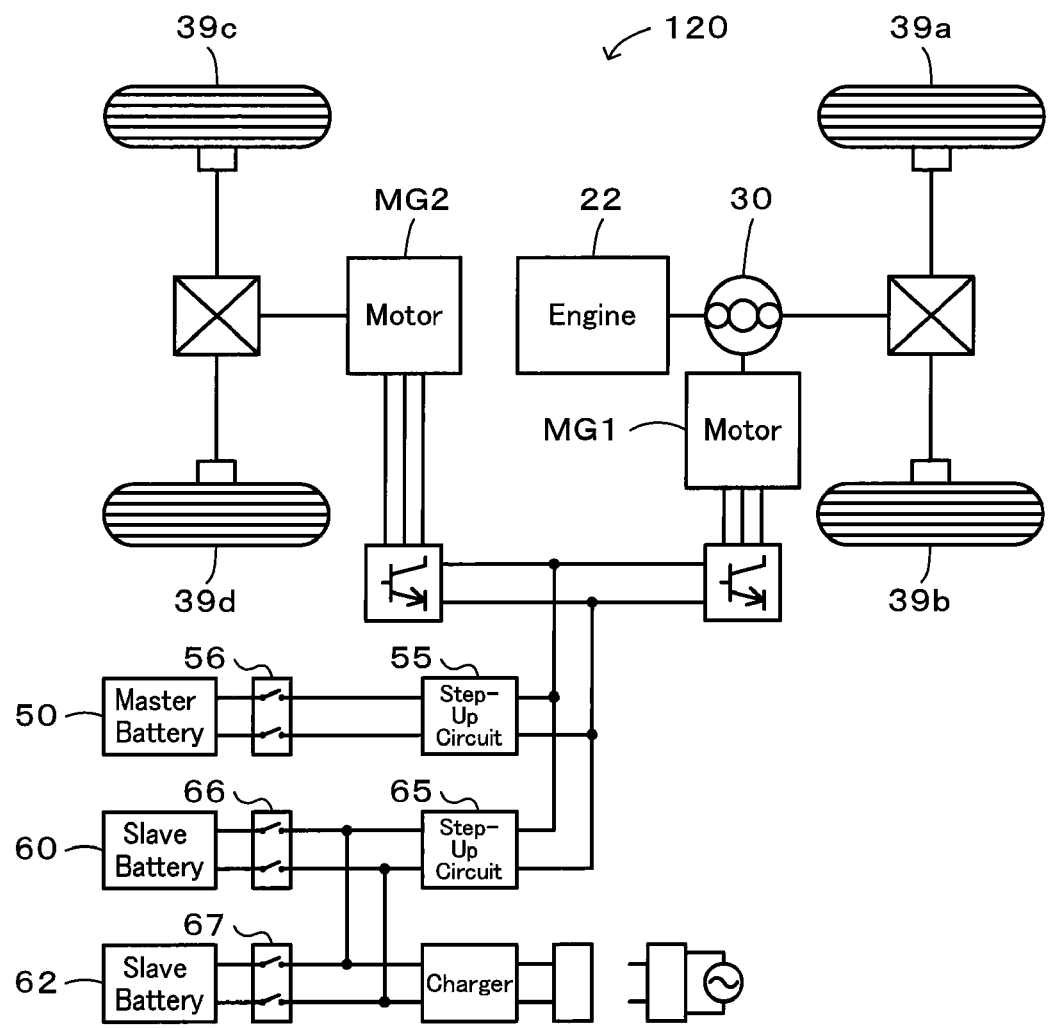
FIG. 7 is a configuration diagram showing an outline of a configuration of a hybrid vehicle 120 of a modified example.

In the hybrid vehicle 20 of the embodiment, the power from the engine 22 is output via the planetary gear 30 to the driveshaft 32 linked to the driving wheels 39a and 39b, and the power from the motor MG2 is output to the driveshaft 32. However, as illustrated in a hybrid vehicle 120 of a modified example of FIG. 7, the power from the engine 22 may be output via the planetary gear 30 to the driveshaft 32 linked to the driving wheels 39a and 39b, and the power from the motor MG2 may be output to another axle (an axle linked to wheels 39c and 39d in FIG. 7) that is different from the axle (the axle linked to the driving wheels 39a and 39b) linked to the driveshaft 32.

Figure 8:
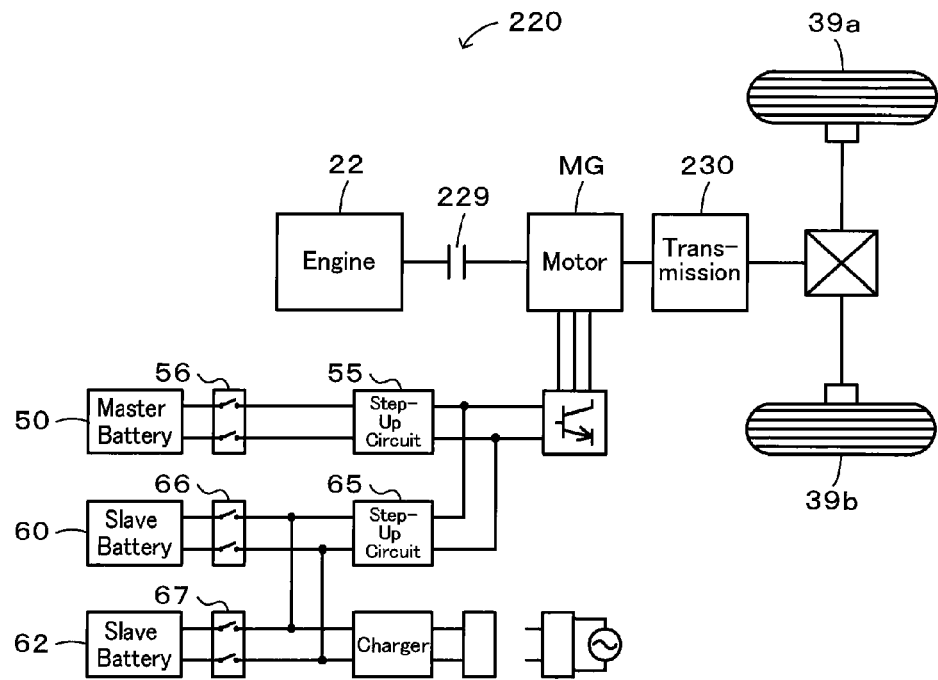
FIG. 8 is a configuration diagram showing an outline of a configuration of a hybrid vehicle 220 of a modified example.
Figure 9:
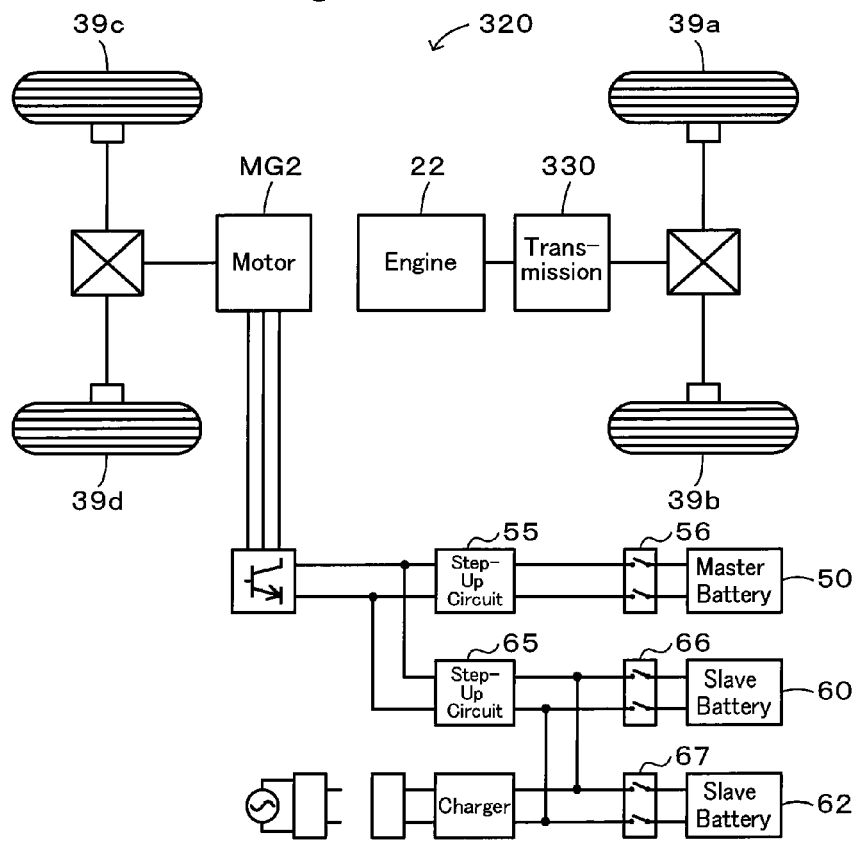
FIG. 9 is a configuration diagram showing an outline of a configuration of a hybrid vehicle 320 of a modified example.

In the hybrid vehicle 20 of the embodiment, the power from the engine 22 is output via the power distribution integration mechanism 30 to the driveshaft linked to the driving wheels 39a and 39b, and the power from the motor MG2 is output to the driveshaft 32. The technique of the invention is also applicable to a hybrid vehicle 220 of a modified structure shown in FIG. 8. In the hybrid vehicle 220 of FIG. 8, the motor MG is attached via a transmission 230 to a driveshaft linked to the driving wheels 39a and 39b and the engine 22 is connected via a clutch 229 to the rotating shaft of the motor MG. In this hybrid vehicle 220, the power from the engine 22 is output to the driveshaft via the rotating shaft of the motor MG and the transmission 230, and the power from the motor MG is output via the transmission 230 to the driveshaft. The technique of the invention is also applicable to a hybrid vehicle 320 of a modified structure shown in FIG. 9. In the hybrid vehicle 320 of FIG. 9, the power from the engine 22 is output via a transmission 330 to the axle linked with the driving wheels 39a and 39b, and the power from the motor MG is output to another axle (an axle linked with wheels 39c and 39d of FIG. 9) that is different from the axle linked with the driving wheels 39a and 39b.

Figure 10:
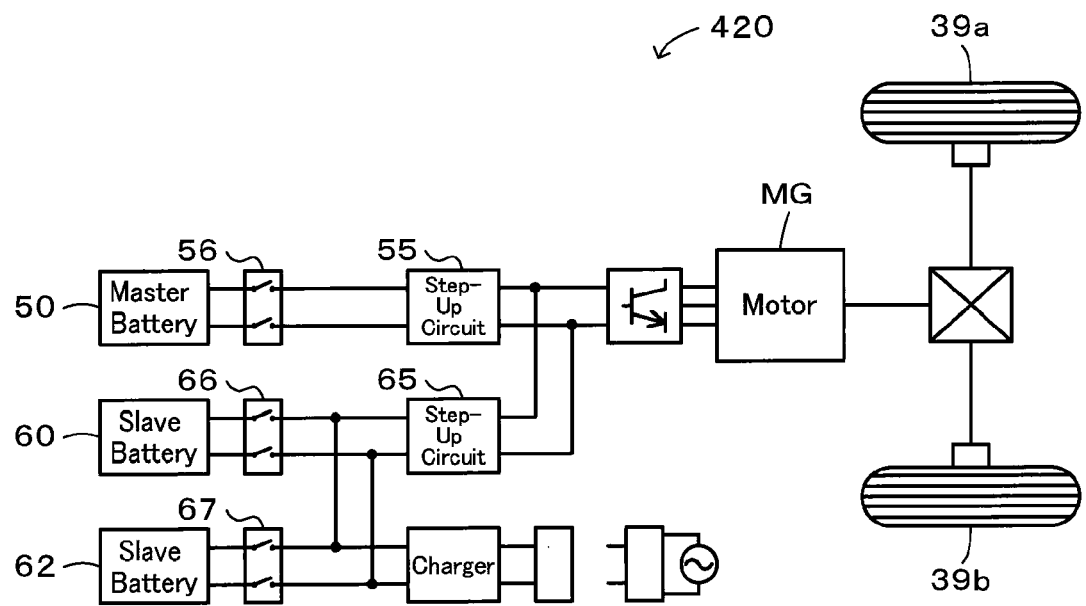
FIG. 10 is a configuration diagram showing an outline of a configuration of an electric vehicle 420 of a modified example.

In the embodiment, the invention is applied to the hybrid vehicle 20 having the engine 22 and the motor MG1 that are connected via planetary gear 30 with the driveshaft 32, the motor MG2 that are connected with the driveshaft 32. The technique of the invention is also applicable to an electric vehicle 420 of a modified structure shown in FIG. 10. In the electric vehicle 420 of FIG. 10, the electric vehicle has the motor MG that outputs the power for driving the electric vehicle.

In the embodiment and the modified example, the present invention is described by using the mode of applying the present invention to an electric vehicle and a hybrid vehicle, but the present invention may be in the mode of a method for setting a total allowable discharge electric energy which sets a total allowable discharge electric energy that is an electric energy allowed to be discharged in a whole of the battery device in such an electric vehicle and a hybrid vehicle.

The correspondence of the main elements of the embodiment and the main elements of the invention described in the column of Summary of Invention will be described. In the embodiment, the motor MG2 corresponds to "the motor". The master battery 50 and the slave batteries 60 and 62 that are constructed as lithium-ion secondary batteries and the system main relays 56, 66 and correspond to a "battery device". The charger 90 corresponds to a "charger". The hybrid electronic control unit 70, which executes the connection state setting routine of FIG. 3 for setting the slave battery 60 as a used battery when the accumulated charge amount SOC2 of the slave battery 60 reaches the preset accumulated charge amount Sref2 or less in the first connection state in which the master battery 50 and the slave battery 60 are connected to the motor MG1 and MG2 sides (the inverters 41 and 42 sides), and sets the slave battery 62 as the used battery when the accumulated charge amount SOC3 of the slave battery 62 reaches the preset accumulated charge amount Sref3 or less in the second connection state in which the master battery 50 and the slave battery 62 are connected to the motors MG1 and MG2 sides, corresponds to a "used secondary battery setting unit". The hybrid electronic control unit 70, which executes the EV priority allowable electric energy setting routine of FIG. 6 for setting, at the time of the first connection state, the accumulated charge amount differences $\Delta SOC1$, $\Delta SOC2$ and $\Delta SOC3$ of the master battery 50 and the slave batteries 60 and 62 respectively as the allowable discharge electric energies E1, E2 and E3, and setting the sum of the set allowable discharge electric energies E1, E2 and E3 as the EV priority allowable electric energy Eev that is the electric energy allowed to be discharged as the whole of the master battery 50 and the slave batteries 60 and 62 when the vehicle travels in the motor travel priority mode, and setting, at the time of the second connection state, the accumulated charge amount differences $\Delta SOC1$ and $\Delta SOC3$ of the master batteries 50 and 62 respectively as the allowable discharge electric energies E1 and E3, setting value 0 as the allowable discharge electric energy E2, and setting the sum of the allowable discharge electric energies E1, E2 and E3 as the EV priority allowable electric energy Eev, corresponds to a "total discharge electric energy setting unit". Further, the hybrid electronic control unit 70 which controls the system main relay 56 so that the master battery 50 is connected to the motors MG1 and MG2 sides, and controls the system main relays 66 and 67 so that the slave batteries 60 and 62 are sequentially switched one by one and are connected to the motors MG1 and MG2 sides corresponds to a "battery device control unit", and the display 89 and the hybrid electronic control unit 70 that outputs a display signal to the display 89 so as to display the information such as the EV priority allowable electric energy Eev and the EV priority allowable distance Lev on the display 89 in accordance with necessity correspond to "the reporting system". Further, the engine 22 corresponds to an "internal combustion engine", the motor MG1 corresponds to a "generator", and the planetary gear 30 corresponds to a "planetary gear mechanism". The hybrid electronic control unit 70, which, at the time of the first connection state and the second connection state, sets the motor travel priority mode in which the vehicle travels with priority put on travel in the motor drive mode (motor travel) as the travel mode, sets the sum of the output limit Wout1 of the master battery 50 and the output limit of the connected slave battery (at the time of the first connection state, the sum of the output limit Wout1 of the master battery 50 and the output limit Wout2 of the slave battery 60, and at the time of the second connection state, the sum of the output limit Wout1 of the master battery 50 and the output limit Wout3 of the slave battery 62) as the output limit Wout, calculates the travel power Pdrv* by multiplying the torque demand Tr* based on the accelerator opening Acc and the vehicle speed V by the rotation speed of the driveshaft 32, controls the engine 22 and the motors MG1 and MG2 so that the vehicle performs motor travel when the calculated travel power Pdrv* is the output limit Wout or less, and controls the engine 22 and the motors MG1 and MG2 so that the vehicle travels in the engine drive mode (hybrid travel) when the travel power Pdrv* is larger than the output limit Wout, the engine ECU 24 and the motor ECU 40 correspond to a "drive control system".

The "motor" is not restricted to the motor MG2 constructed as a synchronous motor generator but may be any other type of motor constructed to input and output power to a driveshaft, for example, an induction motor. The "battery device" is not restricted to the master battery 50 and the slave batteries 60 and 62 constructed as a lithium-ion secondary batteries, and the system main relays 56, 66 and 67, but may be any other thing that includes at least a plurality of secondary batteries capable of exchanging electric power with the motor, and a connecting-releasing parts that perform connection of each of the plurality of secondary batteries to the motor side and release of the connection, for example, one master battery and three or more slave batteries, one master battery and one slave battery, two or more master batteries and two or more slave batteries, a secondary battery other than lithium-ion battery (for example, nickel metal hydride secondary battery, nickel cadmium secondary battery, and lead acid secondary battery) and including the master side step-up circuit 55 and the slave side step-up circuit 65. The "charger" is not restricted to the charger 90 including the charging relay, the AC-to-DC converter and the DC-to-DC converter, but may be any other thing that is at least connected to an external power supply in a state of system shutdown, and charges the secondary battery by using electric power from the external power supply. The "used secondary battery setting unit" is not restricted to the used secondary battery setting unit that sets the slave battery 60 as the used battery when the accumulated charge amount SOC2 of the slave battery 60 reaches the preset accumulated charge amount Sref2 or less in the first connection state, and sets the slave battery 62 as the used battery when the accumulated charge amount SOC3 of the slave battery 62 reaches the preset accumulated charge amount Sref3 or less in the second connection state, but may be any other thing that at least sets, as the used secondary battery, the secondary battery in which the accumulated charge amount that is the electric energy capable of being discharged reaches the preset accumulated charge amount or less out of a plurality of secondary batteries. The "total discharge electric energy setting unit" is not restricted to the total discharge electric energy setting unit that sets the accumulated charge amount differences $\Delta SOC1$, $\Delta SOC2$ and $\Delta SOC3$ of the master battery 50 and the slave batteries 60 and 62 respectively as the allowable discharge electric energies E1, E2 and E3, and sets the sum of the set allowable discharge electric energies E1, E2 and E3 as the EV priority allowable electric energy Eev that is the electric energy that is allowed to be discharged as the whole of the master battery 50 and the slave batteries 60 and 62 when the vehicle travels in the motor travel priority mode at the time of the first connection state, and sets the accumulated charge amount differences $\Delta SOC1$ and $\Delta SOC3$ of the master battery 50, and 62 respectively as the allowable discharge electric energies E1 and E3, sets the allowable discharge electric energy E2 to value 0, and sets the sum of these allowable discharge electric energies E1, E2 and E3 as the EV priority allowable electric energy Eev at the time of the second connection state, but may be any other thing that at least sets the total allowable discharge electric energy that is the electric energy that is allowed to be discharged in the whole of the battery device without reflecting the allowable discharge electric energy that is the electric energy allowed to be discharged with respect to the used secondary battery when the vehicle travels by the power from the motor in the state in which at least one of the usable secondary batteries that are the secondary batteries that are not set as the used secondary batteries out of a plurality of secondary batteries is connected to the motor side. The "battery device control unit" is not restricted to the battery device control unit that controls the system main relay 56 so that the master battery 50 is connected to the motors MG1 and MG2 sides, and controls the system main relays 66 and 67 so that the slave batteries 60 and 62 are sequentially switched one by one and connected to the motors MG1 and MG2 sides, but may be any other thing that at least controls the main connection release part so that the main secondary battery is connected to the motor side, and controls one or more auxiliary connection release part so that the usable auxiliary secondary batteries that are the secondary batteries that are not set as the used secondary batteries out of one or more auxiliary secondary batteries are sequentially switched one by one and connected to the motor side. The "reporting system" is not restricted to the reporting system that displays the information such as the EV priority allowable electric energy Eev and the EV priority allowable distance Lev on the display 89 in accordance with necessity, but may be any other thing that at least reports the total allowable discharge electric energy and/or the travelable distance by the total allowable discharge electric energy that is obtained from the total allowable discharge electric energy. The "internal combustion engine" is not restricted to the internal combustion engine that outputs power by the hydrocarbon fuel such as gasoline or light oil, but may be an internal combustion engine of any other type such as a hydrogen engine. The "generator" is not restricted to the motor MG1 that is constructed as a synchronous motor generator, but may be any other type of generator that can exchange electric power with the secondary batteries connected to the motor side out of a plurality of secondary batteries and can input and output power, such as an induction motor. The "planetary gear mechanism" is not restricted to the planetary gear 30, but may be any other thing with three rotation elements respectively connected to three shafts, an output shaft of the internal combustion engine, a rotating shaft of the generator, and a driveshaft linked to an axle. The "drive control system" is not restricted to the combination constituted of the hybrid electronic control unit 70, the engine ECU 24 and the motor ECU 40, but may be constructed by a single electronic control unit, or the like. Further, the "drive control system" is not restricted to the drive control system that at the time of the first connection state and the second connection state, sets the motor travel priority mode in which the vehicle travels with priority put on the travel in the motor drive mode (motor travel) as the travel mode, sets the sum of the output limit Wout1 of the master battery 50 and the output limit of the connected slave battery (at the time of the first connection state, the sum of the output limit Wout1 of the master battery 50 and the output limit Wout2 of the slave battery 60, and at the time of the second connection state, the sum of the output limit Wout1 of the master battery 50 and the output limit Wout3 of the slave battery 62) as the output limit Wout, calculates the travel power Pdrv* by multiplying the torque demand Tr* based on the accelerator opening Acc and the vehicle speed V by the rotation speed of the driveshaft 32, controls the engine and the motors MG1 and MG2 so that the vehicle performs motor travel when the calculated travel power Pdrv* is the output limit Wout or less, and controls the engine 22 and the motors MG1 and MG2 so that the vehicle travels in the engine drive mode (hybrid travel) when the travel power Pdrv* is larger than the output limit Wout, but may be any other thing that controls the internal combustion engine, the generator and the motor so that the vehicle travels with priority put on motor travel out of motor travel for traveling by using only the power input and output from the motor and hybrid travel for travelling by using the power that is output from the internal combustion engine and the power that is input and output from the motor when the usable secondary battery is present.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

Industrial Applicability

The technique of the invention is preferably applied to the manufacturing industries of the electric vehicles.

The invention claimed is:
1. An electric vehicle travelling by using power from a motor, said electric vehicle comprising:
   a battery device having:
      a main secondary battery,
      a first auxiliary secondary battery and
      a second auxiliary secondary battery as a plurality of secondary batteries capable of exchanging electric power with said motor,
      a main connecting-releasing part that performs a connection of said main secondary battery to a side of said motor and release of said connection, and
      a second auxiliary connecting-releasing part that performs a connection of said second auxiliary secondary battery to a side of said motor and release of said connection;
   a charger that is connected to an external power supply in a state of system shutdown, and charges said plurality of secondary batteries by using electric power from said external power supply;
   a used secondary battery setting unit that sets a secondary battery in which an accumulated charge amount that is an electric energy that can be discharged reaches a preset accumulated charge amount or less out of said plurality of secondary batteries, as a used secondary battery;
   a battery device control unit that:
      controls said main connecting-releasing part so that said main secondary battery is connected to said side of said motor,
      controls a first auxiliary connecting-releasing part and said second auxiliary connecting-releasing part so that said first auxiliary secondary battery is connected to said side of said motor and said connection of said second auxiliary secondary battery and said side of said motor is released before said first auxiliary secondary battery is set as said used secondary battery, and
      controls said first auxiliary connecting-releasing part and said second auxiliary connecting-releasing part so that said connection of said first auxiliary secondary battery and said side of said motor is released and said second auxiliary secondary battery is connected said side of said motor after said first auxiliary secondary battery is set as said used secondary battery; and
   a total allowable discharge electric energy setting unit that:
      sets a total allowable discharge electric energy that is an electric energy that is allowed to be discharged in a whole of said battery device by using an allowable discharge electric energy that is said electric energy allowed to be discharged with respect to said main secondary battery, said allowable discharge electric energy with respect to said first auxiliary secondary battery, and said allowable discharge electric energy with respect to said second auxiliary secondary battery when said main secondary battery and said first auxiliary secondary battery are connected to said side of said motor, and
      sets said total allowable discharge electric energy by using said allowable discharge electric energy with respect to said main secondary battery and said allowable discharge electric energy with respect to said second auxiliary secondary battery without using said allowable discharge electric energy with respect to said first auxiliary secondary battery when said main secondary battery and said second auxiliary secondary battery are connected to said side of said motor.

2. The electric vehicle according to claim 1, wherein said total allowable discharge electric energy setting unit that further:
   sets a difference between said accumulated charge amount and said preset accumulated charge amount of said main secondary battery as said allowable discharge electric energy with respect to said main secondary battery,
   sets a difference between said accumulated charge amount and said preset accumulated charge amount of said second auxiliary secondary battery as said allowable discharge electric energy with respect to said second auxiliary secondary battery when said main secondary battery and said first auxiliary secondary battery are connected to said side of said motor,
   sets said difference between said accumulated discharge amount and said preset accumulated discharge amount of said main secondary battery as said allowable discharge electric energy with respect to said main secondary battery,
   sets said difference between said accumulated charged amount and said preset accumulated charge amount of said second auxiliary secondary battery as said allowable discharge electric energy with respect to said secondary auxiliary secondary battery,
   sets value 0 as said allowable discharge electric energy with respect to said first auxiliary secondary battery when said main secondary battery and said second auxiliary secondary battery are connected to said side of said motor, and sets a sum of respective allowable discharge electric energies of said plurality of secondary batteries as said total allowable discharge electric energy.

3. The electric vehicle according to claim 1, wherein said battery device is a device having:
   a main step-up/down circuit that exchanges electric power with regulation of a voltage between a main battery voltage system connected to said main secondary battery and a high voltage system at said side of said motor via said first auxiliary connecting-releasing part, and
   an auxiliary step-up/down circuit that exchanges electric power with regulation of a voltage between an auxiliary battery voltage system connected to said first auxiliary secondary battery and said second auxiliary secondary battery, and said high voltage system at said side of said motor via said first auxiliary connecting-releasing part, and said second auxiliary connecting-releasing part, and said battery device control unit is a unit that:
   controls said main connecting-releasing part and said main step-up/down circuit so that said main secondary battery is connected to said side of said motor and electric power from said main secondary battery is supplied to said motor,
   controls said first auxiliary connecting-releasing part, said second auxiliary connecting-releasing part and said auxiliary step-up/down circuit so that said first auxiliary secondary battery is connected to said side of said motor, connection of said second auxiliary secondary battery and said side of said motor is released, and electric power from said first auxiliary secondary battery is supplied to said motor before said first auxiliary secondary battery is set as said used secondary battery, and
   controls said first auxiliary connecting-releasing part, said secondary auxiliary connecting-releasing part and said auxiliary step-up/down circuit so that said second auxiliary secondary battery is connected to said side of said motor, said connection of said first auxiliary secondary battery and said side of said motor is released, and electric power from said second auxiliary secondary battery is supplied to said motor after said first auxiliary secondary battery is set as said used secondary battery.

4. The electric vehicle according to claim 1, said electric vehicle further comprising an information reporting system that reports said set total allowable discharge electric energy and a travelable distance by said total allowable discharge electric energy that is obtained from said set total allowable discharge electric energy.

5. The electric vehicle according to claim 1, wherein said battery device control unit is a unit that controls said first auxiliary connecting-releasing part and said second auxiliary connecting-releasing part so that said connection of said first auxiliary secondary battery and said second auxiliary secondary battery to said side of said motor is released after said first auxiliary secondary battery and said second auxiliary secondary battery are set as used secondary batteries.

6. The electric vehicle according to claim 5, said electric vehicle further comprising:
   an internal combustion engine;
   a generator:
      capable of exchanging electric power with said secondary battery out of said plurality of secondary batteries that is connected to said side of said motor out of said plurality of secondary batteries, and
      capable of inputting and outputting power;
   a planetary gear mechanism with three rotation elements connected to three shafts that are:
      an output shaft of said internal combustion engine,
      a rotating shaft of said generator, and
      a driveshaft linked to an axle; and
   a drive control system that:
      controls said internal combustion engine, said generator and said motor so that said electric vehicle travels with priority put on motor travel out of said motor travel for traveling by using only power that is input and output from said motor and hybrid travel for traveling by using power that is output from said internal combustion engine and said power that is input and output from said motor before said first auxiliary secondary battery and said second auxiliary secondary battery are set as said used secondary batteries, and
      controls said internal combustion engine, said generator and said motor so that said electric vehicle travels with priority put on said hybrid travel out of said motor travel and said hybrid travel after said first auxiliary secondary battery and said second auxiliary secondary battery are set as said used secondary batteries.

7. A method for setting a total allowable discharge electric energy in an electric vehicle for setting said total allowable discharge electric energy that is an electric energy allowed to be discharged in a whole of a battery device in the electric vehicle, said method comprising:
   (a) a motor that outputs power for travelling, the battery device having a main secondary battery, a first auxiliary secondary battery and a second auxiliary secondary battery as a plurality of secondary batteries capable of exchanging electric power with said motor, and a main connecting-releasing part that performs a connection of said main secondary battery to a side of said motor, and release of said connection, a first auxiliary connecting-releasing part that performs a connection of said first auxiliary secondary battery to a side of said motor and release of said connection, and a second auxiliary connecting-releasing part that performs a connection of said secondary auxiliary secondary battery to a side of said motor and release of said connection, and a charger that is connected to an external power supply and charges said plurality of secondary batteries by using electric power from the external power supply in a state of system shutdown;
   (b) setting the secondary battery with an accumulated charge amount that is an electric energy capable of being discharged reaching a preset accumulated charge amount or less out of said plurality of secondary batteries, as a used secondary battery;
   (c) controlling said main connecting-releasing part so that said main secondary battery is connected to said side of said motor;
   (d) controlling said first auxiliary connecting-releasing part and said second auxiliary connecting-releasing part so that said first auxiliary secondary battery is connected to said side of said motor, and said connection of said second auxiliary secondary battery and said side of said motor is released before said first auxiliary secondary battery is set as said used secondary battery;
   (e) controlling said first auxiliary connecting-releasing part and said second auxiliary connecting-releasing part so that the connection of said first auxiliary secondary battery and said side of said motor is released and said second auxiliary secondary battery is connected to said side of said motor after said first auxiliary secondary battery is set as said used secondary battery;
- (f) setting said total allowable discharge electric energy by using an allowable discharge electric energy that is an electric energy that is allowed to be discharged with respect to said main secondary battery, said allowable discharge electric energy with respect to said first auxiliary secondary battery, and said allowable discharge electric energy with respect to said second auxiliary secondary battery when said main secondary battery and said first auxiliary secondary battery are connected to said side of said motor; and
- (g) setting said total allowable discharge electric energy by using said allowable discharge electric energy with respect to said main secondary battery and said allowable discharge electric energy with respect to said second auxiliary secondary battery without using said allowable discharge electric energy with respect to said first auxiliary secondary battery when said main secondary battery and said second auxiliary secondary battery are connected to said side of said motor.

8. The method for setting said total allowable discharge electric energy in said electric vehicle according to claim 7, wherein said step (f) are further steps of:
- setting a difference between said accumulated charge amount of said main secondary battery and said preset accumulated charge amount as said allowable discharge electric energy with respect to said main secondary battery,
- setting a difference between said accumulated charge amount of said first auxiliary secondary battery and said preset accumulated charge amount as said allowable discharge electric energy with respect to said first auxiliary secondary battery,
- setting a difference between said accumulated charge amount of said second auxiliary secondary battery and said preset accumulated charge amount as said allowable discharge electric energy with respect to said second auxiliary secondary battery when said main secondary battery and said first auxiliary secondary battery are connected to said side of said motor;
- setting a difference between said accumulated charge amount of said main secondary battery and said preset accumulated charge amount as said allowable discharge electric energy with respect to said main secondary battery,
- setting a difference between said accumulated charge amount of said second auxiliary secondary battery and said preset accumulated charge amount as said allowable discharge electric energy with respect to said second auxiliary secondary battery,
- setting value 0 as said allowable discharge electric energy with respect to said first auxiliary secondary battery when said main secondary battery and said second auxiliary secondary battery are connected to said side of said motor; and
- setting a sum of respective allowable discharge electric energies of said plurality of secondary batteries as said total allowable discharge electric energy.

9. An electric vehicle travelling by using power from a motor, said electric vehicle comprising:
- a battery device having:
  - a main secondary battery,
  - a first auxiliary secondary battery and
  - a second auxiliary secondary battery as a plurality of secondary batteries capable of exchanging electric power with said motor,
  - a main connecting-releasing part that performs a connection of said main secondary battery to a side of said motor and release of said connection,
  - a first auxiliary connecting-releasing part that performs a connection of said first auxiliary secondary battery to a side of said motor and release of said connection,
  - a second auxiliary connecting-releasing part that performs a connection of said second auxiliary secondary battery to a side of said motor and release of said connection,
  - a main step-up/down circuit that exchanges electric power with regulation of a voltage between a main battery voltage system connected to said main secondary battery and a high voltage system at said side of said motor via said first auxiliary connecting-releasing part, and
  - an auxiliary step-up/down circuit that exchanges electric power with regulation of a voltage between an auxiliary battery voltage system connected to said first auxiliary secondary battery and said second auxiliary secondary battery and said high voltage system at said side of said motor via said first auxiliary connecting-releasing part and said second auxiliary connecting-releasing part;
- a charger that is connected to an external power supply in a state of system shutdown, and charges said plurality of secondary batteries by using electric power from said external power supply;
- a used secondary battery setting unit that sets a secondary battery in which an accumulated charge amount that is an electric energy that can be discharged reaches a preset accumulated charge amount or less out of said plurality of secondary batteries, as a used secondary battery;
- a connection-release control unit that:
  - controls said main connecting-releasing part so that said main secondary battery is connected to said side of said motor,
  - controls said first auxiliary connecting-releasing part and said second auxiliary connecting-releasing part so that said first auxiliary secondary battery is connected to said side of said motor and the connection of said second auxiliary secondary battery and said side of said motor is released before said first auxiliary secondary battery is set as said used secondary battery, and
  - controls said first auxiliary connecting-releasing part and said second auxiliary connecting- releasing part so that the connection of said first auxiliary secondary battery and said motor side is released and said second auxiliary secondary battery is connected to said side of said motor after said first auxiliary secondary battery is set as said used secondary battery; and
- a step-up/down circuit control unit that:
  - sets a distribution ratio that is a ratio of said auxiliary side electric power to a sum of main side electric power that is electric power that is supplied to said side of said motor from said main battery voltage system and auxiliary side electric power that is electric power that is supplied to said side of said motor from said auxiliary battery voltage system by using an allowable discharge electric energy that is an electric energy that is allowed to be discharged with respect to said main secondary battery, said allowable discharge electric energy with respect to said first auxiliary secondary battery, and said allowable discharge electric energy with respect to said second auxiliary secondary battery when said main secondary battery and said first auxiliary secondary battery are connected to said side of said motor, sets said distribution ratio by using said allowable discharge electric energy with respect to said main secondary battery and said allowable discharge electric energy with respect to said second auxiliary secondary battery without using said allowable discharge electric energy with respect to said first auxiliary secondary battery when said main secondary battery and said second auxiliary secondary battery are connected said side of said motor, and controls said main step-up/down circuit and said auxiliary step-up/down circuit so that a voltage of said high voltage system becomes a target voltage and said auxiliary side electric power becomes electric power corresponding to said set distribution ratio.

10. The electric vehicle according to claim 9, wherein said connection-release control unit is a unit that controls said first auxiliary connecting-releasing part and said second auxiliary connecting-releasing part so that said connection of said first auxiliary secondary battery and said second auxiliary secondary battery to said side of said motor is released after said first auxiliary secondary battery and said second auxiliary secondary battery are set as used secondary batteries.

11. The electric vehicle according to claim 10, said electric vehicle further comprising:

an internal combustion engine;

a generator:

capable of exchanging electric power with said secondary battery out of said plurality of secondary batteries that is connected to said side of said motor out of said plurality of secondary batteries, and capable of inputting and outputting power;

a planetary gear mechanism with three rotation elements connected to three shafts that are:

an output shaft of said internal combustion engine, a rotating shaft of said generator, and a driveshaft linked to an axle; and a drive control system that:

controls said internal combustion engine, said generator and said motor so that said electric vehicle travels with priority put on motor travel out of said motor travel for traveling by using only power that is input and output from said motor and hybrid travel for traveling by using power that is output from said internal combustion engine and said power that is input and output from said motor before said first auxiliary secondary battery and said second auxiliary secondary battery are set as said used secondary batteries, and controls said internal combustion engine, said generator and said motor so that said electric vehicle travels with priority put on said hybrid travel out of said motor travel and said hybrid travel after said first auxiliary secondary battery and said second auxiliary secondary battery are set as said used secondary batteries.

* * * * *